United States Patent
Hwang

(10) Patent No.: US 10,310,577 B2
(45) Date of Patent: Jun. 4, 2019

(54) POWER COMMUNICATION APPARATUS USING MICROPHONE JACK

(71) Applicant: GMK CO., LTD., Seoul (KR)

(72) Inventor: Jin Soon Hwang, Seoul (KR)

(73) Assignee: GMK CO., LTD., Seoul (KR)

( * ) Notice: Subject to any disclaimer, the term of this patent is extended or adjusted under 35 U.S.C. 154(b) by 298 days.

(21) Appl. No.: 15/212,685

(22) Filed: Jul. 18, 2016

(65) Prior Publication Data
US 2017/0336842 A1 Nov. 23, 2017

(30) Foreign Application Priority Data
May 19, 2016 (KR) .................. 10-2016-0061181

(51) Int. Cl.
| | | |
|---|---|---|
| *G06F 1/26* | (2006.01) | |
| *G06F 13/362* | (2006.01) | |
| *H04L 5/16* | (2006.01) | |
| *G06F 13/42* | (2006.01) | |

(52) U.S. Cl.
CPC ............ *G06F 1/266* (2013.01); *G06F 13/362* (2013.01); *G06F 13/42* (2013.01); *H04L 5/16* (2013.01); *Y02D 10/14* (2018.01)

(58) Field of Classification Search
None
See application file for complete search history.

(56) References Cited

U.S. PATENT DOCUMENTS

| | | | | |
|---|---|---|---|---|
| 4,922,547 | A | * 5/1990 | Murata | .................. H04M 1/605 381/355 |
| 7,346,329 | B2 | 3/2008 | Motohashi | |
| 7,859,991 | B2 | 12/2010 | Fujii | |
| 8,019,096 | B2 | * 9/2011 | Sander | .................. H04R 1/1041 381/122 |
| 9,210,500 | B2 | * 12/2015 | Allen | ....................... H04R 3/00 |

(Continued)

FOREIGN PATENT DOCUMENTS

| | | | |
|---|---|---|---|
| CN | 103929696 A | * 7/2014 | |
| EP | 2654168 A1 | * 10/2013 | ............ H02J 7/0044 |

(Continued)

OTHER PUBLICATIONS

'Headphone type detection' an IP.com Prior Art Database Technical Disclosure, IPCOM000215489D, Mar. 1, 2012. (Year: 2012).*

(Continued)

*Primary Examiner* — Steven G Snyder
(74) *Attorney, Agent, or Firm* — RatnerPrestia

(57) ABSTRACT

Disclosed is a host communication module, which is provided in a host device that can be connected to a slave device, including: a host power communication unit, in a transmission mode, receiving a power voltage for driving an active slave device from the host device and allowing the host device and the active slave device to perform power communication using the power voltage, and in a reception mode, receiving a power pulse from the active slave device and allowing the host device and the active slave device to perform power communication using the power pulse and a terminal connection unit transmitting or receiving the power pulse to or from the active slave device via a microphone jack provided in the host device.

13 Claims, 17 Drawing Sheets

(56) References Cited

U.S. PATENT DOCUMENTS

| | | | |
|---|---|---|---|
| 9,299,335 B2* | 3/2016 | Lan | H04R 1/1025 |
| 9,313,595 B1* | 4/2016 | Jain | H04R 29/00 |
| 9,319,768 B2* | 4/2016 | Larsen | H04R 1/1041 |
| 9,674,598 B2* | 6/2017 | Prentice | H04R 1/1083 |
| 10,021,477 B2* | 7/2018 | Kim | H04R 1/1083 |
| 2005/0201305 A1* | 9/2005 | Shibata | H04L 5/16 370/282 |
| 2009/0179768 A1* | 7/2009 | Sander | H04M 1/05 340/13.27 |
| 2010/0260341 A1* | 10/2010 | Sander | H04R 1/1041 381/1 |
| 2010/0303251 A1* | 12/2010 | Im | H04R 1/1041 381/74 |
| 2012/0051554 A1* | 3/2012 | Modi | H04R 3/00 381/74 |
| 2014/0050330 A1* | 2/2014 | Allen | H04R 3/00 381/74 |
| 2014/0241535 A1* | 8/2014 | Poulsen | H04R 29/001 381/58 |
| 2014/0376734 A1* | 12/2014 | Lan | H04R 1/1025 381/71.6 |
| 2016/0249127 A1* | 8/2016 | Kim | H04R 1/1083 |
| 2017/0019725 A1* | 1/2017 | Zhao | H04R 1/1041 |

FOREIGN PATENT DOCUMENTS

| | | | | |
|---|---|---|---|---|
| GB | 2499952 A | * | 9/2013 | H04R 1/1041 |
| KR | 1020060042236 A | | 5/2006 | |
| KR | 100847505 B1 | | 7/2008 | |
| KR | 1020080106767 A | | 12/2008 | |
| KR | 101307749 B1 | | 9/2013 | |

OTHER PUBLICATIONS

'Understanding TRRS and Audio Jacks' by Cable Chick, Feb. 13, 2014. (Year: 2014).*

Preliminary Rejection issued in Korean Patent Application 10-2016-0061181 dated Jun. 1, 2017, 23 pages.

* cited by examiner

POWER COMMUNICATION APPARATUS USING MICROPHONE JACK

CROSS REFERENCE TO RELATED APPLICATIONS

This application claims priority to Korean Patent Application No. 10-2016-0061181 filed on May 19, 2016 in the Korean Intellectual Property Office, the disclosure of which is incorporated herein by reference in its entirety.

BACKGROUND

1. Technical Field

The present disclosure relates to a power communication apparatus using a microphone jack.

2. Description of the Related Art

Due to the spread of portable audio devices such as MP3 players and smart devices, consumers' earphone use has been prolonged. Smart devices not only allow users to listen to music, but also provide various items of content such as videos, audio calls, and games to users. Thus, demand has grown for the improvement of the performance of earphones and the provision of additional functions to earphones.

A device such as earphones connected to a smart device to perform additional functions is referred to as a slave device. To realize a variety of additional functions, new slave devices have been developed that require the supply of power for driving additional active devices. These slave devices can be driven by power supplied from a host device via additional power lines, in which case, the additional power lines need to be provided. To address this problem, the necessity of a method to supply power to a slave device using an existing 4-pole audio jack has emerged.

FIG. 1 illustrates an existing 4-pole audio jack.

Referring to FIG. 1, a standard 4-pole audio jack 10 includes a first terminal 11 and a second terminal 12, which are for outputting audio signals of a host device, and a microphone (or ground) jack 13 and a ground (microphone) jack 14, which are for receiving microphone signals. Since the terminals 11 through 14 of the 4-pole audio jack 10 transmit or receive their respective predefined analog signals, it is impossible for the host device to supply power to a slave device with the use of the 4-pole audio jack 10.

FIG. 2 is a schematic view illustrating the structures of an existing host device 30 and an existing slave device 20.

FIG. 2 illustrates earphones 20 as an example of the slave device 20. The earphones 20, which use the 4-pole audio jack 10, may include a left (L)-channel speaker 21, a right (R)-channel speaker 22, a microphone 23, and the 4-pole audio jack 10. The microphone 23 may be equipped with a volume key, a call key, and the like.

The 4-pole audio jack 10 may be connected to a 4-pole audio connector 31 of a mobile phone 30. The first and second terminals 11 and 12 of the 4-pole audio jack 10 transmit audio data to the L- and R-channel speakers 21 and 22, respectively, of the earphones 20, and thus, the earphones 20 may provide a user with sound data output by the mobile phone 30.

The user may use the earphones 20 to make a call. More specifically, the user may press the call key of the microphone 23 to initiate a call. The microphone 23 receives audio data from the user and transmits the audio data to the mobile phone 30 via the microphone jack 13 of the 4-pole audio jack 10. During a call, the user may control the volume of the microphone 23 by using the volume key of the microphone 23.

As mentioned above, the function of the earphones 20 is fairly limited to exchanging audio data with the mobile phone 30, and thus, it is not a problem that the earphones 20 are not equipped with any active device. Since the earphones 20 are not provided with any active device, the microphone 23 and the speakers 21 and 22 of the earphones 20 can be driven even with a small amount of current provided by the 4-pole audio jack 10. Thus, no additional lines are needed to supply power from the mobile phone 30 to the earphones 20 or to perform additional data communication.

The 4-pole audio jack 10 of the host device 30 can supply a small amount of current to the slave device 30 using a bias voltage from the host device 30. Slave devices capable of performing a simple handshake operation with the use of a small amount of current have been suggested. However, high-performance chips cannot be driven with such a small amount of current. Thus, active slave devices that need the supply of additional power have been designed to have an additional power source device of their own.

A bias voltage terminal of the host device 30 includes a bias resistor. The impedance of the bias resistor is set to a similar level to the impedance of a load to generate a minute analog current signal. In general, a high-performance chip can be driven only by being supplied with a current of tens to hundreds of mA.

Due to the high bias resistance of the bias voltage terminal, a large voltage drop may be caused at the bias voltage terminal even by a small load current. Due to this voltage drop, the load cannot be supplied with a sufficient voltage. For example, in a case in which a bias resistance of 2 KΩ is connected in series to a bias voltage of 2.8 V, a voltage drop of 2 V is caused simply by applying a current of only about 1 mA to the load, and thus, a voltage of 0.8 V is supplied to the load. Accordingly, the load may not be able to properly operate.

To overcome this problem, a voltage may be directly supplied without the aid of the bias resistor. In this case, a sufficient current may be applied, but the function of the microphone 23, i.e., the transmission of audio and key input signals to the host device 30, may not be able to be properly performed. Thus, the need arises to apply a power voltage to the microphone 23 so as to supply a sufficient current to an active device and at the same time to transmit audio and key input signals to the host device 30.

An exemplary additional function of a slave device such as earphones is active noise cancellation (ANC). ANC reduces ambient noise from the surroundings of a host device and thus improves the quality of an audio. A device for use in ANC needs the supply of additional power. The Boss QuiteComfort20 earphones or the Sony MDR-NC13 earphones are equipped with a battery and a charger circuit for supplying power. These battery-powered earphones, however, are generally expensive and are difficult to be miniaturized.

In order for a slave device to perform a complicated function, the slave device needs to be controlled by a host device through data communication with the host device. However, as mentioned above with reference to FIGS. 1 and 2, the 4-pole audio jack 10 does not include a separate terminal for digital data transmission. Thus, the host device 30 and the slave device 20 cannot perform data communication with each other without installing an additional line.

To solve this problem, a method is needed not only for a host device to efficiently transmit power and data with an existing microphone jack, but also for a slave device to transmit data to the host device using the existing microphone jack.

Also, in order for a host device to selectively supply power and data to a slave device connected to the host device, a method is needed to efficiently determine whether the slave device requires the supply of power and data.

SUMMARY

Exemplary embodiments of the present disclosure provide a method of allowing a host device to determine whether a slave device connected to the host device requires the supply of power and data by using a microphone jack among other connectors between the host device and the slave device and an apparatus to which the method is applied.

Exemplary embodiments of the present disclosure also provide a method of allowing a host device and an active slave device to perform power communication by allowing the host device to transmit power and data to the active slave device with the use of a microphone jack and allowing the active slave device to transmit data to the host device using the microphone jack and an apparatus to which the method is applied.

Exemplary embodiments of the present disclosure also provide a method of allowing a host device and a slave device to perform half-duplex power communication and an apparatus to which the method is applied.

Exemplary embodiments of the present disclosure also provide a method of generating a polling signal for use in half-duplex power communication between a host device and a slave device and an apparatus to which the method is applied.

Exemplary embodiments of the present disclosure also provide a method of allowing a user to make an active slave device operate as a passive slave device.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to the exemplary embodiments, the attribute of a slave device currently connected to a host device can be determined without the use of an additional high-performance chip.

Also, a host device can transmit power required by an active slave device and host data to the active slave device using an existing microphone jack, and the active slave device can transmit slave data to the host device using the existing microphone jack.

Also, a host device and an active slave device can effectively exchange digital data with each other in a half-duplex manner and can thus secure a large bandwidth for power communication.

Other features and aspects will be apparent from the following detailed description, the drawings, and the claims.

According to aspect of the present invention, there is provided a host communication module, which is provided in a host device that can be connected to a slave device, comprising: a host power communication unit, in a transmission mode, receiving a power voltage for driving an active slave device from the host device and allowing the host device and the active slave device to perform power communication using the power voltage, and in a reception mode, receiving a power pulse from the active slave device and allowing the host device and the active slave device to perform power communication using the power pulse; and a terminal connection unit transmitting or receiving the power pulse to or from the active slave device via a microphone jack provided in the host device, wherein the host power communication unit includes a host current fluctuation generator, which, in the transmission mode, receives host data from the host device, generates the power pulse for the active slave device by encoding the power voltage into a first voltage or a second voltage different from the first voltage, and supplies the power pulse to the active slave device via the microphone jack, and a host voltage fluctuation detector, which, in the reception mode, detects a variation in the voltage of the power pulse caused by a manipulation of the active slave device and decodes slave data received from the active slave device by using the detected variation in the voltage of the power pulse.

According to another aspect of the present invention, there is provided a host communication module, which is provided in a host device that can be connected to a slave device, comprising: a terminal connection unit receiving a bias voltage from the host device and connected to at least one terminal for electrical connection to the slave device; and an attribute recognition unit detecting a drop in the bias voltage, determining the slave device as being an active slave device if the dropped bias voltage is higher than a key recognition voltage and lower than a regular bias voltage, and determining the slave device as being a passive slave device if the dropped bias voltage is not lower than the regular bias voltage.

According to another aspect of the present invention, there is provided a host communication module provided in a host device, which can be connected to a slave device, comprising: a terminal connection unit receiving a bias voltage from the host device and connected to at least one terminal for electrical connection to the slave device; and an attribute recognition unit detecting a variation in the frequency of the bias voltage, determining the slave device as being an active slave device if the varied frequency of the bias voltage is higher than a second frequency band, and determining the slave device as being a passive slave device if the varied frequency of the bias voltage is not higher than the second frequency band.

According to another aspect of the present invention, there is provided an active slave device, which can be electrically connected to a host device, comprising: a microphone line; a slave power communication unit, in a reception mode, receiving a power pulse from the host device via the microphone line and performing power communication using the power pulse, and in a transmission mode, receiving a power voltage from the host device and performing perform power communication using the power voltage; a voltage adjustment unit extracting a driving voltage for driving an active device provided in the active slave device from the power pulse; and an active device driving unit receiving the driving voltage from the voltage adjustment unit and driving the active device, wherein the slave power communication unit includes a slave current fluctuation detector, which, in the transmission mode, generates the power pulse by encoding the power voltage into a first voltage or a second voltage different from the first voltage according to slave data received from the active device and supplies the power pulse to the host device via the microphone line, and a slave voltage fluctuation detector, which, in the reception mode, detects a variation in the voltage of the power pulse and decodes host data received from the host device by using the detected variation in the voltage of the power pulse.

According to another aspect of the present invention, there is provided a slave communication module, which is provided in a slave device that can be connected to a host device, comprising: a microphone line; and an attribute setting unit setting a bias voltage at a microphone jack, which connected to the host device via the microphone line, to a level lower than a regular bias voltage from a microphone jack of the host device and higher than a key recognition voltage of the slave device, if the slave device is an active slave device.

According to another aspect of the present invention, there is provided a slave communication module, which is provided in a slave device that can be connected to a host device, comprising: a microphone line; and an attribute setting unit applying a higher frequency than a second frequency to a bias voltage at a microphone jack, which is connected to the host device via the microphone line, if the slave device is an active slave device.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In addition, it will be understood that the singular forms are intended to include the plural forms as well. It will be further understood that the terms "comprises" and/or "comprising," when used in this specification, specify the presence of stated features, integers, steps, operations, elements, and/or components, but do not preclude the presence or addition of one or more other features, operations, elements, and/or components thereof.

The terms used herein will now be defined as below to clearly describe the inventive concept.

As used herein, the term "host device" is intended to refer to an electronic device that is driven by its own power source. Also, as used herein, the term "slave device" is intended to refer to an accessory that is electrically connected to the host device and performs various functions. Examples of the host device include a computing device equipped with a 4-pole audio jack, such as a personal computer (PC), a notebook computer, or a tablet computer, and a mobile device such as a smartphone, an MP3 player, or a portable media player (PMP), but the present disclosure is not limited thereto.

Examples of the slave device include earphones, headphones, and a headset, which are each equipped with a 4-pole audio line connected to the 4-pole audio jack of the host device and are connected to the computing device or the mobile device, but the present disclosure is not limited thereto.

Figure 3:
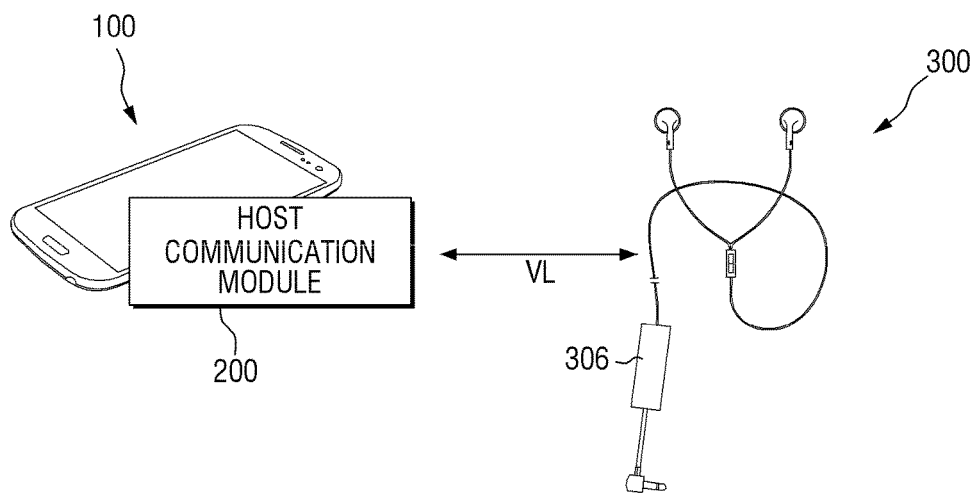
FIG. 3 is a schematic view illustrating a host communication module according to an exemplary embodiment of the present disclosure and an active slave device according to an exemplary embodiment of the present disclosure.

Exemplary embodiments of the present disclosure will hereinafter be described, taking a mobile phone as an example of the host device and earphones as an example of the slave device. FIG. 3 is a schematic view illustrating a host communication module 200 according to an exemplary embodiment of the present disclosure and an active slave device 300 according to an exemplary embodiment of the present disclosure.

For a better understanding of the present disclosure, a slave device equipped with an active device and supplied with power from, and performing digital data communication with, a host device 100, is defined as an active slave device, and a slave device equipped with no particular active device and thus neither supplied with power from, nor performing digital communication with, the host device 100, is defined as a passive slave device.

Also, digital data transmitted from the host device 100 to the active slave device 300 is defined as host device, and digital data transmitted from the active slave device 300 to the host device 100 is defined as slave data.

The host communication module 200 and the active slave device 300 will hereinafter be described with reference to FIG. 3. The host communication module 200 may be installed in the host device 100.

Figure 1:
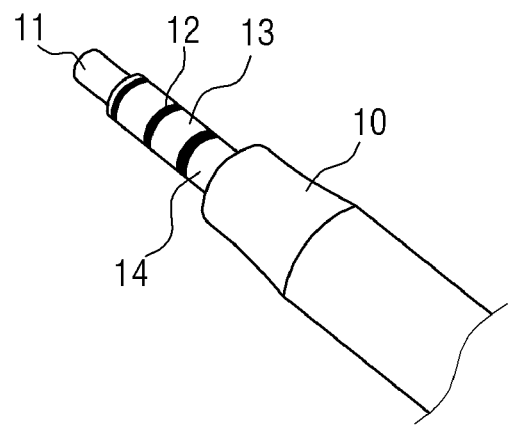
FIG. 1 is a schematic view illustrating an existing 4-pole audio jack.
Figure 2:
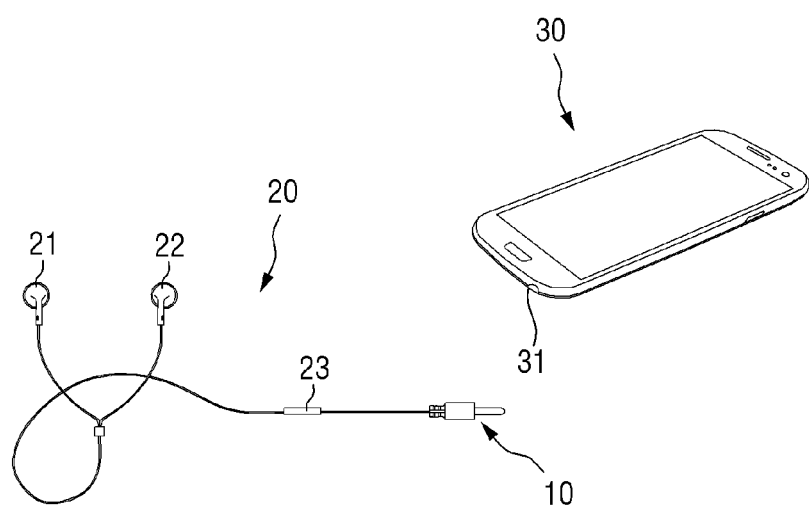
FIG. 2 is a schematic view illustrating an existing host device and an existing slave device.

The active slave device 300 differs from the earphones 20 of FIG. 2 in that it further includes an active device 306, which requires digital communication and the supply of power. The active device 306 performs an additional function of the active slave device 300.

The active device 306 may be, for example, an active noise cancellation (ANC) solution, a bone conduction microphone, a three-dimensional (3D) sound device, a digital microphone, a sensor, or a device for use in radio frequency (RF) control, but the present disclosure is not limited thereto. That is, the active device 306 may be any device that requires the supply of power and is included in a device performing digital communication with the host device 100. In the present disclosure, it is assumed that the active device 306 performs an ANC function.

In a case in which a user listens to music simply using the ANC function, a microphone line of earphones is not used. Thus, power may be supplied to the active device 306, which is used for noise cancellation, via the microphone line. In a case in which power is directly supplied from the host device 100 to the earphones via the microphone line, the earphones do not need to have a separate battery, and thus, the issue of miniaturization can be addressed.

However, this type of method still has problems. As discussed above, if power is supplied to the earphones via the microphone line, the power can be used in the ANC function of the earphones, but the earphones and a mobile phone still cannot perform data communication. Thus, the mobile phone still cannot control the ANC function of the earphones. Also, the earphones cannot transmit ANC-related data to the mobile phone. To address these problems, power and digital data may be encoded at the same time and may be transmitted with efficiency via a microphone line provided as a single power line.

The host communication module 200 receives a power voltage HOST Vp, which is to be transmitted to the active slave device 300, from a power terminal of the host device 100. The host communication module 200 receives host data from an output terminal HOST_DOUT of the host device 100. Also, the host communication module 200 transmits slave data, which is received from the active slave device 300, to an input terminal HOST_DIN of the host device 100.

The host communication module 200 generates a power pulse VL by encoding the host data in the power voltage HOST Vp, and transmits the generated power pulse VL to the active slave device 300. The active slave device 300 generates a power pulse VL by encoding the slave data in the power voltage HOST Vp, and transmits the generated power pulse VL to the host device 100. The transmission of a power pulse VL by the host communication module 200 and the transmission of a power pulse VL by the active slave device 300 may both be performed via an existing microphone line. It will be described later in detail how the host communication module 200 and the active slave device 300 encode a power pulse VL using the power voltage HOST Vp and perform power communication.

The active slave device 300 receives a power pulse VL from the host communication module 200. The power voltage HOST Vp, which is provided by the power pulse VL, is used to drive the active device 306 in the active slave device 300. The active slave device 300 decodes the host data encoded in the power pulse VL and provides the decoded host data to the active device 306. The active device 306 controls an additional function of the active slave device 300 using the host data. The active slave device 300 encodes the power pulse VL with reference to the slave data that is generated according to the operation of the active device 306. The active slave device 300 transmits the power pulse VL to the host communication module 200 and performs power communication.

Figure 4:
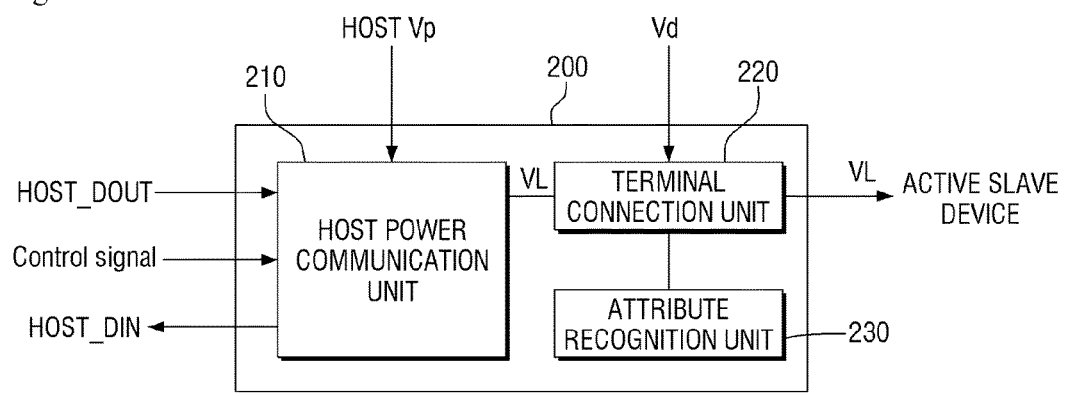
FIG. 4 is a block diagram of the host communication module of FIG. 3.

FIG. 4 is a block diagram of the host communication module 200.

The host communication module 200 performs power communication with the active slave device 300. The host communication module 200 includes a host power communication unit 210 and a terminal connection unit 220.

The host power communication unit 210 receives the power voltage HOST Vp and host data HOST_DOUT from the host device 1000, generates a power pulse VL based on the power voltage HOST Vp and the host data HOST_DOUT, and performs power communication with the active slave device 300.

Figure 5:
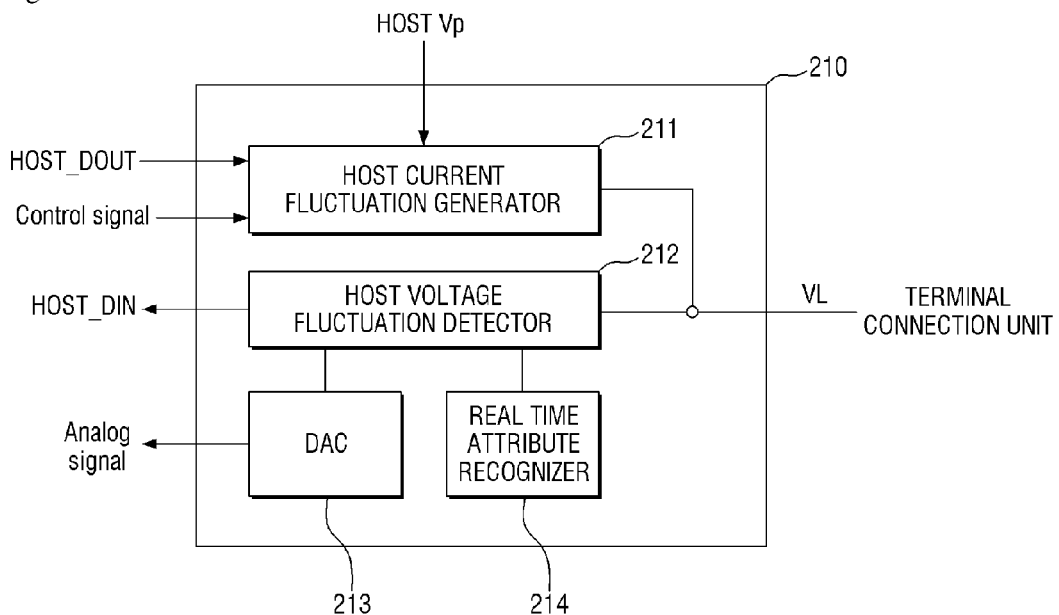
FIG. 5 is a detailed block diagram of a host power communication unit illustrated in FIG. 4.

FIG. 5 is a detailed block diagram of the host power communication unit 210 of FIG. 4.

Referring to FIG. 5, the host power communication unit 210 may include a host current fluctuation generator 211 and a host voltage fluctuation detector 212.

In a case in which the host device 100 operates in a transmission mode, the host current fluctuation generator 211 encodes the host data HOST_DOUT in the power voltage HOST Vp, thereby generating a power pulse VL to be transmitted to the active slave device 300.

In a case in which the host device 100 operates in a reception mode, the host voltage fluctuation detector 212 decodes the power pulse VL provided by the active slave device 300 and thus restores slave data. The restored slave data is transmitted to the digital input terminal HOST_DIN of the host device 100. Since power communication using the power pulse VL is performed via a single microphone line, data transmission and data reception cannot be performed at the same time.

Figure 6:
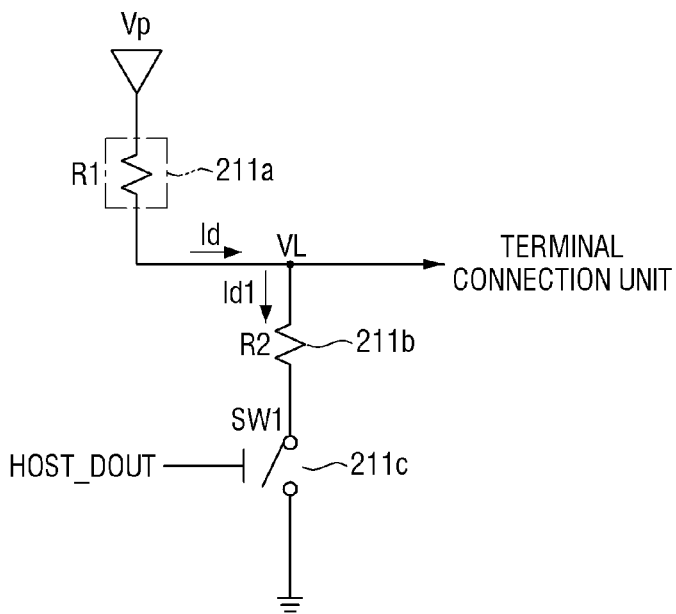
FIG. 6 is a circuit diagram of a host current fluctuation generator illustrated in FIG. 5.

FIG. 6 is a circuit diagram of the host current fluctuation generator 211 of FIG. 4.

Figure 7:
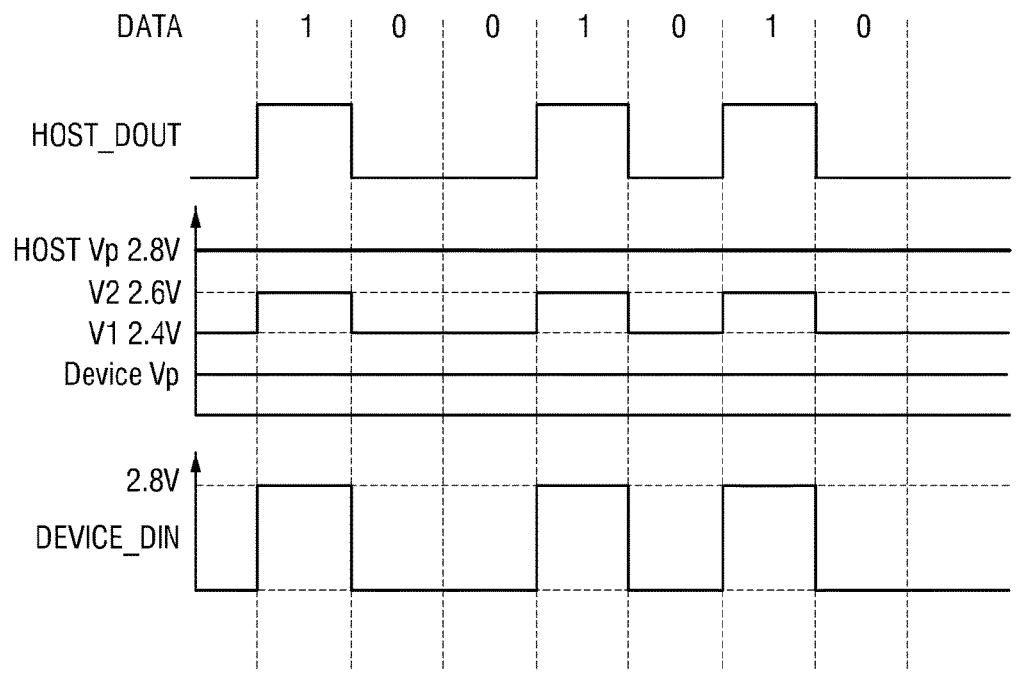
FIG. 7 is a timing diagram illustrating a power pulse transmitted from a host device to an active slave device, according to some exemplary embodiments of the present disclosure.

FIG. 7 is a timing diagram illustrating a power pulse transmitted from the host device 100 to the active slave device 300, according to some exemplary embodiments of the present disclosure.

It will hereinafter be described with reference to FIGS. 6 and 7 how the host current fluctuation generator 211 encodes the power voltage HOST Vp into a power pulse VL. The host current fluctuation generator 211 may include at least one load R1 (211*a*), which is connected to a power voltage input terminal Vp.

For a typical power voltage HOST Vp does not include a serial resistor, but for power communication, a very small resistor may be provided to measure the amount of current applied from the power voltage HOST Vp. The load R1 (211*a*) provided at the power voltage input terminal Vp may be a resistor having a small resistance of about 1Ω to 10Ω or a Schottky diode. In a case in which the host current fluctuation generator 211 includes a small resistor or a Schottky diode, a large voltage drop does not occur at a power pulse node VL even when the current at the power voltage input terminal Vp fluctuates. Thus, the host device 100 can transmit a stable power voltage to the active slave device 300.

In response to the power voltage HOST Vp being supplied, a voltage is formed at the power pulse node VL. Due to the load R1 (211*a*) and a current Id resulting from the supply of the power voltage HOST Vp, a relatively lower voltage than the power voltage HOST Vp is formed at the power pulse node VL.

The power pulse node VL may include a load R2 (211*b*), which generates a leakage current Id1, and a switch SW1 (211*c*), which is connected in series to the load R2 (211*b*). The switch SW1 (211*c*) is controlled by the host data HOST_DOUT. In a case in which a data value of 0 is received as the host data HOST_DOUT, the switch SW1 (211*c*) is closed, and thus, the leakage current Id1 is generated. Due to the leakage current Id1, the voltage at the power pulse node VL becomes lower when the switch SW1 (211*c*) is closed than when the switch SW1 (211*c*) is open. The host current fluctuation generator 211 controls the switch SW1 (211*c*) according to the host data HOST_DOUT and thus encodes the power voltage HOST Vp into a power pulse VL.

The internal circuitry of the host current fluctuation generator 211, as illustrated in FIG. 6, is exemplary, and the present disclosure is not limited thereto.

For a better understanding of the present disclosure, it is assumed that the host data HOST_DOUT is "1001010". The power voltage HOST Vp of the host device 100 may generally be about 2.8 V.

FIG. 7 illustrates a timing diagram of a power pulse VL corresponding to the host data HOST_DOUT. It is assumed that if a data value of 0 is received as the host data HOST_DOUT, the switch SW1 of the host current fluctuation generator 211 of FIG. 6 is closed. The voltage at the power pulse node VL when the switch SW1 is closed in response to the receipt of a data value of 0 as the host data HOST_DOUT is defined as a voltage V1, and the voltage at the power pulse node VL when the switch SW1 is opened in response to the receipt of a data value of 1 as the host data HOST_DOUT is defined as a voltage V2.

Referring to FIG. 7, the voltage V1 may be 2.4 V, and the voltage V2 may be higher than the voltage V1 and may be 2.6 V. In response to a voltage of 2.6 V being received as the voltage of a power pulse VL, the active slave device 300 may determine that the host device 100 has transmitted a data value of 1 as the host data HOST_DOUT. On the other hand, in response to a voltage of 2.4 V being received as the voltage of the power pulse VL, the active slave device 300 may determine that the host device 100 has transmitted a data value of 0 as the host data HOST_DOUT.

The voltages V1 and V2 need to be set to be higher than a driving voltage Device Vp of the active slave device 300. For example, the driving voltage Device Vp of the active slave device 300 may be set to be 70% or less of the power voltage HOST Vp. By doing so, a power pulse VL may supply a uniform driving voltage Device Vp to the active slave device 300 regardless of the value of the host data HOST_DOUT. As shown in FIG. 7, the driving voltage Device Vp for driving the active slave device 300 may be 1.96 V (=2.8 V×70%), which is lower than the voltages V1 and V2.

A power pulse VL obtained by the host current fluctuation generator 211 encoding the power voltage HOST Vp based on the host data HOST_DOUT, is as illustrated in the middle of FIG. 7. The power pulse VL is decoded into host data DEVICE_DIN by the active slave device 300. The host data DEVICE_DIN is as illustrated at the bottom of FIG. 7. The levels of some voltages as set forth herein are exemplary, and thus, the present disclosure is not limited thereto.

It has been described above how the host current fluctuation generator 211 encodes the power voltage HOST Vp into a power pulse VL using a variation in the leakage current Id1 at the power pulse node VL. Another method of encoding a power pulse VL, as performed by the host current fluctuation generator 211, will hereinafter be described.

The host current fluctuation generator 211 may be replaced with a host voltage fluctuation generator (not illustrated). The host voltage fluctuation generator generates a power pulse VL by encoding host data in the power voltage HOST Vp.

The host voltage fluctuation generator may include at least one multiplexer. The multiplexer may receive the host data HOST_DOUT as a control value. In response to a data value of 1 being received as the host data HOST_DOUT, the multiplexer outputs the voltage V2 as the power pulse VL. On the other hand, in response to a data value of 0 being received as the host data HOST_DOUT, the host voltage fluctuation generator outputs the voltage V1 as the power pulse VL. The voltage V1 may be lower than the power voltage HOST Vp and may be the same as or higher than the driving voltage Device Vp. The structure of the host voltage fluctuation generator is not limited to that set forth herein.

Figure 8:
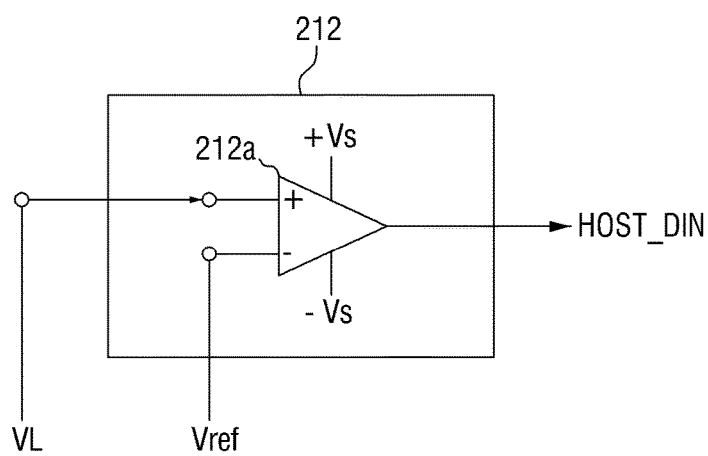
FIG. 8 is a circuit diagram of a host voltage fluctuation detector included in the host power communication unit of FIG. 5.

FIG. 8 is a circuit diagram of the host voltage fluctuation detector 212 included in the host power communication unit 210 of FIG. 5.

The structure and operation of the host voltage fluctuation detector 212 will hereinafter be described with reference to FIG. 8. Referring to FIG. 8, the host voltage fluctuation detector 212 may be implemented as circuitry including a voltage comparator 212a. The host voltage fluctuation detector 212 may compare a power pulse VL with a predefined reference voltage Vref and may thus restore slave data provided by the active slave device 300.

The voltage comparator 212a may be configured to include two or more terminals. One of the terminals of the voltage comparator 212a may receive the reference voltage Vref, and another one of the terminals of the voltage comparator 212a may receive a target voltage to be compared with the reference voltage Vref. In the present exemplary embodiment, a power pulse VL provided by the active slave device 300 is received as the target voltage.

The voltage comparator 212a compares the two voltages received via two of the terminals thereof. If the reference voltage Vref is lower than the voltage of the power pulse VL, the voltage comparator 212a outputs a predefined voltage +Vs. On the other hand, if the reference voltage Vref is higher than the voltage of the power pulse VL, the voltage comparator 212a outputs a predefined voltage −Vs.

The voltage +Vs may be a voltage corresponding to a slave data value of 1. The voltage −Vs may be a voltage corresponding to a slave data value of 0. However, a method of hardware-matching the input and output of the host voltage fluctuation detector 212 is not particularly limited.

Slave data restored by the voltage comparator 212a is input to the input terminal HOST_DIN of the host device 100. The structure of the host voltage fluctuation generator 212 is not limited to that set forth herein.

According to the example of FIG. 7, the voltage +Vs may be 2.8 V, and the voltage −Vs may be 0 V.

To configure the voltage comparator 212a, the host voltage fluctuation detector 212 may include at least one operational amplifier (Op-amp). An Op-amp is commonly used to amplify signals, but in a particular circuit, may serve the functions of the voltage comparator 212a, which compares the magnitudes of voltages. For more information on exemplary circuitry including a voltage comparator 212a having an Op-amp, see http://cherryopatra.tistory.com/139.

The reference voltage Vref may be defined by Equation 1 below.

$$Vref=Vlow+(Vhigh-Vlow)\times 0.3.$$ [Equation 1]

When the voltage of a power pulse VL corresponding to a host data value of 1 is a voltage Vhigh, the voltage Vhigh may have the same level as the voltage V2. When the voltage of a power pulse VL corresponding to a host data value of 0 is a voltage Vlow, the voltage Vlow may have the same level as the voltage V1. According to the example of FIG. 7, the voltage Vhigh is 2.6 V, and the voltage Vlow is 2.4 V. Accordingly, the reference voltage Vref may preferably be 2.66 V.

A method of setting the reference voltage Vref is not limited to that set forth herein. The reference voltage Vref may have an arbitrary level between the voltage Vhigh and the voltage Vlow. However, if the reference voltage Vref is set to a level that satisfies Equation 1, error in the restoration of slave data by the host voltage fluctuation detector 211 may be reduced.

If the reference voltage Vref is lower than the voltage of the power pulse VL, the host voltage fluctuation detector 212 restores a data value of 1 as slave data. On the other hand, if the reference voltage Vref is higher than the level of the power pulse VL, the host voltage fluctuation detector 212 restores a data value of 0 as the slave data. Then, the host voltage fluctuation detector 212 transmits the restored slave data to the input terminal HOST_DIN of the host device 100.

According to the aforementioned power communication method, the host device 100 can supply both the driving voltage Device Vp and the host data HOST_DOUT at the same time to the active slave device 300 via a single microphone line.

Since the aforementioned power communication method uses a 4-pole microphone line established between an existing host device and an existing slave device, there is no need to additionally provide separate lines for data communication and for the supply of power. Also, since the terminals of the existing host device can be directly used, compatibility with the existing host device can be ensured.

The host power communication unit 210 may further include a digital-to-analog (D/A) signal converter 213 and a real-time attribute recognizer 214, which are connected to the host voltage fluctuation detector 212.

The D/A signal converter 213 converts a key input signal and a microphone input signal, which are received in the form of digital signals, into analog signals that can be used by an existing host device. The real-time attribute recognizer 214 recognizes any sudden change in the attribute of the active slave device 300 and allows the host device 100 to perform an operation corresponding to the recognized change in the attribute of the active slave device 300.

The structures and operations of the D/A signal converter 213 and the real-time attribute recognizer 214 will be described later in detail together with the structure and operation of the active slave device 300.

The host communication module 200 may further include an attribute recognition unit 230, which determines the attribute of a slave device currently connected to the host device 100.

The terminal connection unit 220 transmits a power pulse VL to or receives a power pulse VL from the active slave device 300 via the microphone jack of the host device 100. The terminal connection unit 220 may include a switch. In a case in which the host device 100 is connected to a passive slave device, the switch terminates power communication and allows the host device 100 to perform an operation corresponding to the passive slave device.

The attribute recognition unit 230 senses a bias voltage at the terminal connection unit 220 and determines the attribute of the slave device currently connected to the host device 100. It will be described later how the host communication module 200 determines the attribute of the slave device currently connected to the host device 100, with the aid of the terminal connection unit 220 and the attribute recognition unit 230.

In a case in which the host device 100 is connected to the active slave device 300 via a microphone jack, the terminal connection unit 220 closes its switch to connect the microphone jack and the host power communication unit 210 and thus allows power communication to begin.

Figure 9:
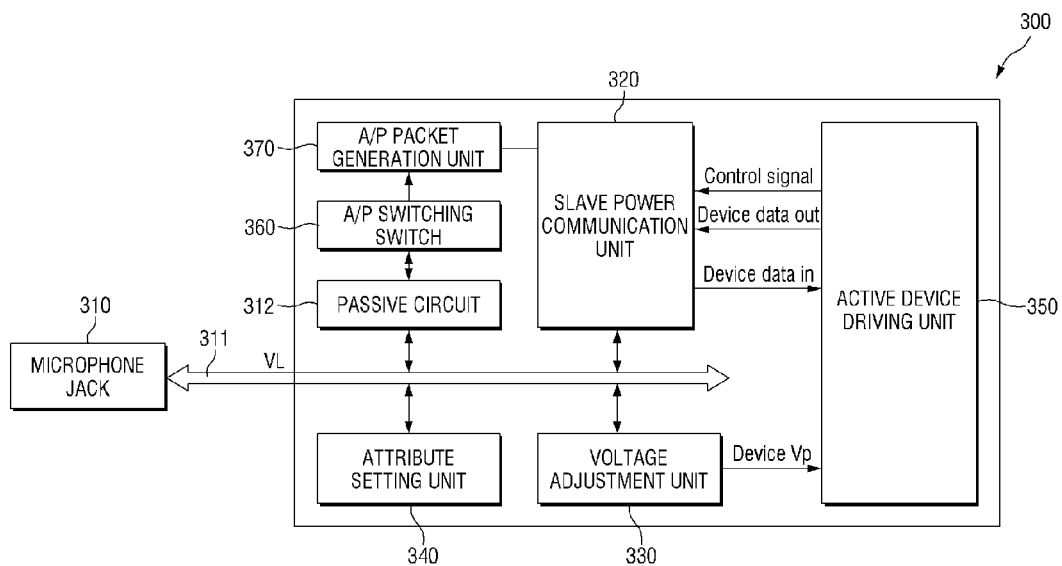
FIG. 9 is a block diagram of the active slave device of FIG. 3.

FIG. 9 is a block diagram of the active slave device 300.

Referring to FIG. 9, the active slave device 300, which performs power communication using a power pulse VL, may include a microphone jack 310, a microphone line 311, and an attribute setting unit 340, which informs the host device 100 of the attribute of the active slave device 300.

Since existing slave devices are mostly passive slave devices not equipped with any active device, existing host devices do not need to determine the attribute of slave devices currently connected thereto. With the recent advent of devices that require the supply of power via a microphone line, the need has arisen for the host device 100 to determine the attribute of the slave device currently connected thereto. In a case in which the host device 100 supplies power to the connected slave device regardless of the attribute of the connected slave device, the supply of power to the connected slave device becomes meaningless, leading to a waste of power.

A typical passive slave device needs only a small amount of current for driving a microphone or speakers. If the host device 100 directly supplies power to the passive slave device, the passive slave device may be broken due to a high voltage and a considerable amount of current supplied by the host device 100.

Also, in a case in which the host device 100 supplies power to an active slave device via a microphone line, the active slave device may not be able to use the microphone line for a microphone function. If the active slave device is, for example, earphones equipped with an existing 4-pole audio jack, a key detection circuit of the microphone of the active slave device may not be able to properly operate due to the supply of power via the microphone line.

To address these problems, the host device 100 may be configured to perform different operations depending on the attribute of the slave device currently connected thereto. To efficiently determine what operation needs to be performed by the host device 100, the host communication module 200, which allows the host device 100 to determine the attribute of the slave device currently connected thereto, and a slave communication module which provides an attribute determination signal, are provided.

In order for an existing host device to recognize the attribute of a slave device currently connected thereto, a chip may be installed in an active slave device so as for the active slave device to transmit an attribute recognition signal directly to a host device. However, this type of method requires the supply of power for driving the chip and is thus only applicable to an active slave device equipped with its own power source.

Alternatively, in response to a host device being connected to a slave device, a host communication module of the host device may transmit power to the slave device to drive a chip installed in the slave device, and the slave device may use the power to transmit an attribute signal to the host device. However, the circuitry of the slave device may be damaged due to the supply of power for identifying the attribute of the slave device from the host device.

To solve these problems, a method is suggested in which the host device 100 determines the attribute of the slave device currently connected thereto using an existing microphone jack, instead of using a high-performance chip that requires the supply of additional power.

Figure 10A:
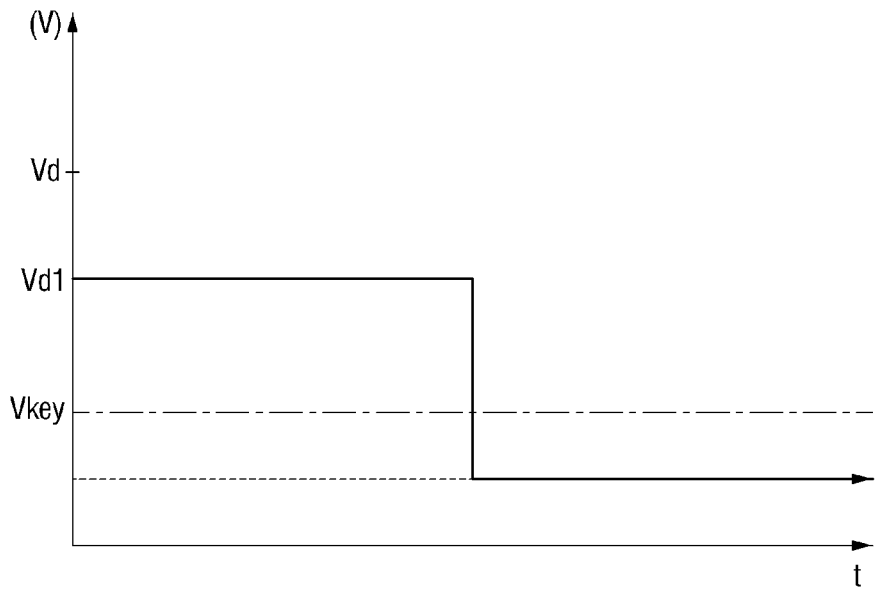
FIG. 10A is a graph for explaining a conventional method of allowing a host device to recognize a key input from a slave device.

FIG. 10A is a schematic view illustrating a conventional method of allowing the host device 100 to recognize a key input from the active slave device 300.

In existing 4-pole earphones, a microphone line is used to receive a call or to transmit a key detection signal such as a volume key signal to a host device. A terminal connection unit of a host device connected to a microphone jack of an existing 4-pole audio jack receives a regular bias voltage Vd for driving a microphone and a key detection circuit from the host device.

The regular bias voltage Vd may be set to about 2.8 V. If the regular bias voltage Vd is directly applied to the microphone jack, the microphone may be damaged due to a high voltage and an excessive amount of current. Thus, the terminal connection unit is provided with a bias resistor Rd to lower the regular bias voltage Vd. A bias voltage Vd1 obtained by lowering the regular bias voltage Vd with the use of the bias resistor Rd may have a uniform level due to the impedance in the microphone. The bias voltage Vd1 is generally in the range of 1.5 V to 2.0 V.

If the user presses a key on the microphone, the microphone determines the pressed key as a key input signal and additionally lowers the bias voltage at the terminal connection unit. The host device recognizes the additional voltage drop and thus identifies a current key input signal.

A threshold level of the bias voltage Vd based on which the host device determines that a key detection signal has been input is defined as a key recognition voltage Vkey. The key recognition voltage Vkey may vary depending on the type of the host device and the type of a slave device currently connected to the host device.

The key recognition voltage Vkey is generally in the range of 0.2 V to 0.75 V. In response to the receipt of a key input, the bias voltage Vd1 drops to a level lower than the key recognition voltage Vkey. The host device recognizes this drop in the bias voltage Vd1 and thus performs an operation corresponding to the key input.

FIG. 10A illustrates how an existing host device detects a key input signal. In response to a key input signal being received, a slave device sets the bias voltage Vd1 at the terminal connection unit of the host device to be lower than the key recognition voltage Vkey. The host device detects the bias voltage Vd1 set to be lower than the key recognition voltage Vkey and performs a necessary operation.

Figure 10B:
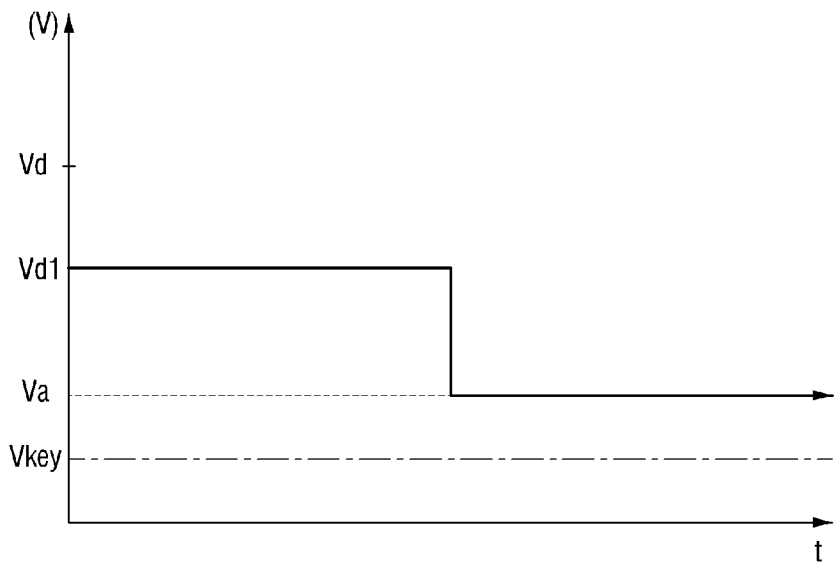
FIG. 10B is a graph for explaining how the host communication module of FIG. 3 determines the attribute of a slave device, according to some exemplary embodiments of the present disclosure.

FIG. 10B is a schematic view illustrating how the host communication module 200 determines the attribute of a slave device, according to some exemplary embodiments of the present disclosure.

According to the above description, there exists a difference between the key recognition voltage Vkey of the host device 100 and the bias voltage Vd1, which results from the impedance in a microphone. The attribute recognition unit 230 may use this voltage difference to determine the attribute of the slave device currently connected to the host device 100.

In a case in which the active slave device 300 is inserted into the host device 100, the attribute setting unit 340 lowers the bias voltage Vd1 at the terminal connection unit 220 of the host communication module 200 in the same manner used for existing earphones to transmit a key input signal to an existing host device. The attribute recognition unit 230 recognizes a drop in the bias voltage Vd1 and thus determines the attribute of the slave device currently connected to the host device 100.

A voltage based on which the attribute recognition unit 230 determines the slave device currently connected to the host device 100 as being an active slave device is defined as an attribute recognition voltage Va. The voltage recognition voltage Va satisfies Equation 2 below.

Ordinary Bias Voltage of Microphone Jack>Attribute Recognition Voltage $Va$>Key Recognition Voltage $Vkey$. [Equation 2]

If the attribute recognition unit 230 determines the slave device currently connected to the host device 100 as being an active slave device, the attribute recognition unit 230 allows a switch SW2 of the terminal connection unit 220 to connect the host power communication unit 210 and the microphone jack 310 and thus enables the host device 100 to perform power communication with the active slave device 300.

Also, if the attribute recognition unit 230 determines the slave device currently connected to the host device 100 as being an active slave device, the attribute recognition unit 230 transmits an authorization signal indicating that the host device 100 has properly recognized the active slave device 300 via the host power communication unit 210 to the active slave device 300 through the power communication with the active slave device 300. In response the authorization signal being received, the active slave device 300 may transmit device information for driving the active slave device 300 and an authorization signal to the host device 100.

If the host device 100 fails to perform power communication with, or fails to receive an authorization signal from, the slave device currently connected thereto, the attribute recognition unit 230 determines the slave device currently connected to the host device 100 as being a passive slave device and applies the bias voltage Vd, via the switch SW2 of the terminal connection unit 220, to the slave device currently connected to the host device 100.

The device information may include a device code, a manufacturer code, and an authorization code of the active slave device 300 and an appropriate driving voltage for and a maximum current consumption of the active slave device 300, but the present disclosure is not limited thereto. That is, the device information may include any information that is helpful for the driving of the active slave device 300.

The host device 100 receives the device information from the active slave device 300 and performs power communication based on the device information. The host device 100 can perform power communication more efficiently with the device information than without the device information.

Figure 11:
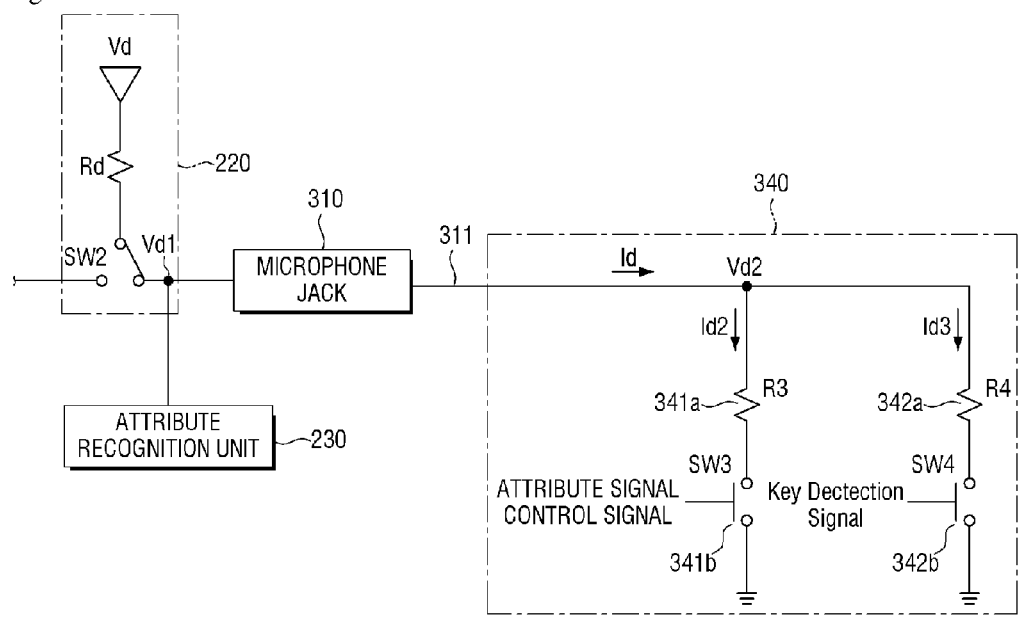
FIG. 11 is a circuit diagram of circuitry for use in determining the attribute of the active slave device of FIG. 9, according to some exemplary embodiments of the present disclosure.

FIG. 11 is a circuit diagram of circuitry for use in determining the attribute of the active slave device 300, according to some exemplary embodiments of the present disclosure.

Referring to FIG. 11, the terminal connection unit 220 is supplied with the regular bias voltage Vd by the host device 100. The terminal connection unit 220 may include the bias resistor Rd, which induces a drop in the regular bias voltage Vd, and the switch SW2, which connects the host power communication unit 210 and the microphone jack 310 according to the attribute of the slave device currently connected to the host device 100.

The attribute setting unit 340 may be provided with a circuit for adjusting a drop in the bias voltage Vd1 at the terminal connection unit 220.

A circuit consisting of a load R3 (341a) and a switch SW3 (341b) controls the switch SW3 (341b) according to the attribute of the slave device currently connected to the host device 100. A signal that allows the active slave device 300 to control the switch SW3 according to the attribute of the active slave device 300 is defined as an attribute signal control signal.

In a case in which the switch SW3 is closed, a current Id2 increases. As a result, a current Id increases, and thus, the bias voltage Vd1 decreases.

A load R4 (342a) and a switch SW4 (342b) constitutes a typical key detection circuit. By controlling the resistances of the load R4 (341a) and the load R4 (342a), a circuit that satisfies Equation 2 above may be obtained. More specifically, the resistances of the load R4 (341a) and the load R4 (342a) may be set such that a larger voltage drop can be induced by the load R4 (342a) than by the load R3 (341a). The switch SW3 (341b) may be implemented as a device that does not require the supply of additional power.

Figure 12:
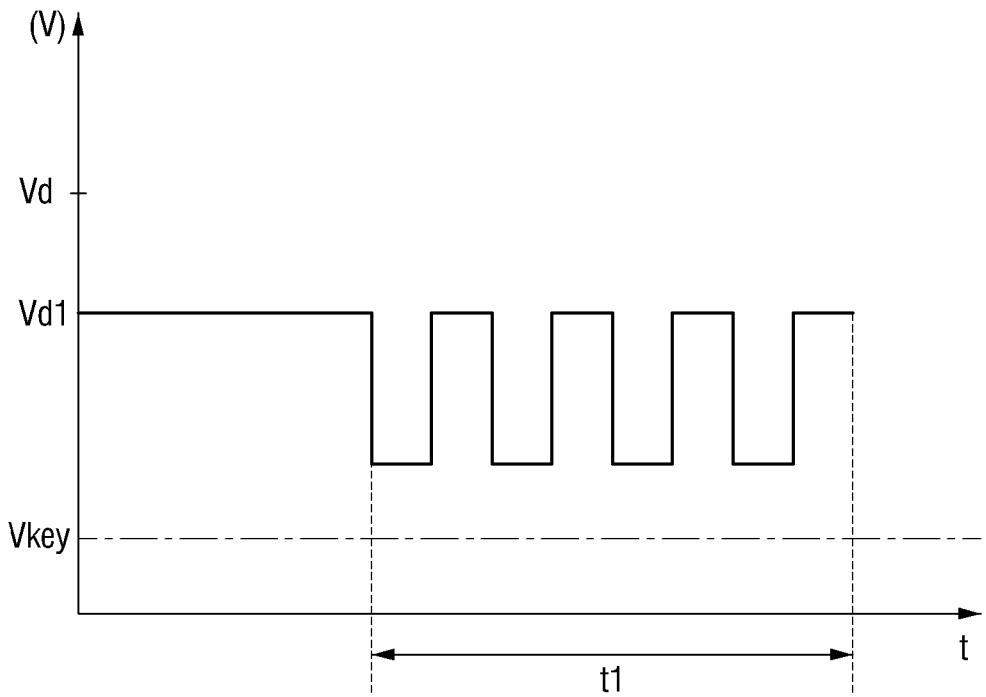
FIG. 12 is a graph for explaining how the host communication module of FIG. 3 determines the attribute of a slave device, according to some other exemplary embodiments of the present disclosure.

FIG. 12 is a graph for explaining how the host communication module 200 determines the attribute of a slave device, according to some other exemplary embodiments of the present disclosure. If the attribute of the slave device currently connected to the host device 100 is determined simply using a drop in the bias voltage Vd1, a key detection circuit may not properly operate due to the voltage drop and may malfunction due to various key recognition voltages.

To address these problems, the attribute setting unit 340 of the active slave device 300 applies a predefined frequency to the bias voltage Vd1 at the terminal connection unit 220. The attribute recognition unit 230 detects a variation in the predefined frequency and may determine the attribute of the slave device currently connected to the host device 100 based on the detected variation in the predefined frequency.

The predefined frequency may preferably be set to be lower than a minimum frequency for driving a microphone. By repeating the opening and closing of the switch SW3 (341b), the predefined frequency may be applied to the bias voltage Vd1. In this case, the switch SW3 (341b) may be implemented as a device that does not require the supply of additional power.

Referring to FIG. 12, the bias voltage Vd1 at the terminal connection unit 220 operates at the predefined frequency for a period t1. The attribute recognition unit 230 may recognize the frequency of the bias voltage Vd1 for the period t1 and may thus determine the attribute of the slave device (i.e., the active slave device 300) currently connected to the host device 100, i.e., the active slave device 300.

The structure of the active slave device 300 will hereinafter be described with reference again to FIG. 9. Referring to FIG. 9, the active slave device 300, which performs power communication using a power pulse VL, may include a slave power communication unit 320, a voltage adjustment unit 330, and an active device driving unit 350.

Figure 13:
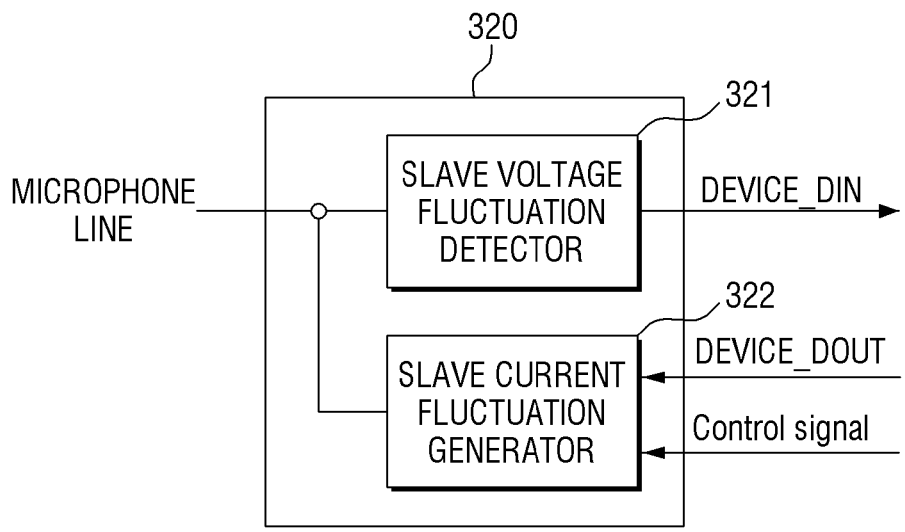
FIG. 13 is a block diagram of a slave power communication unit illustrated in FIG. 9.

FIG. 13 is a block diagram of the slave power communication unit 320 of FIG. 9. Referring to FIG. 13, the slave power communication unit 320 receives a power pulse VL from the host device 100, decodes host data from the received power pulse VL, encodes slave data in a power voltage received from the host device 100, and generates a power pulse VL, thereby performing power communication with the host device 100.

The slave power communication unit 320 may include a slave voltage fluctuation detector 321 and a slave current fluctuation generator 322.

In a case in which the host device 100 operates in a transmission mode, the slave voltage fluctuation detector 321 receives a power pulse VL from the host device 100 and restores host data. The operation of the slave voltage fluctuation detector 321 is the same as the operation of the host voltage fluctuation detector 212. The slave voltage fluctuation detector 321 decodes host data by comparing the voltage of the received power pulse VL with the reference voltage Vref. The slave voltage fluctuation detector 321 transmits the decoded host data to an input terminal DEVICE_DIN of the active device driving unit 350. The operation of the slave voltage fluctuation detector 321 is the same as the operation of the host voltage fluctuation detector 212, and thus, a detailed description thereof will be omitted.

In a case in which the host device 100 operates in a reception mode, the slave current fluctuation generator 322 encodes slave data received from an output terminal DEVICE_DOUT of the active device driving unit 350 in the power voltage HOST Vp provided by the host communication module 200.

The resistance of the microphone line 311 is so minute that no voltage drop occurs in the power voltage HOST Vp provided from the host communication module 200 to the active slave device 300. By using a switch utilizing the slave data as a control signal in the same manner used in the host current fluctuation generator 211, the slave current fluctuation generator 322 may encode the power voltage HOST Vp into a power pulse VL. The operation of the slave current fluctuation generator 322 is the same as the operation of the host current fluctuation generator 211, and thus, a detailed description thereof will be omitted.

The voltage adjustment unit 330 may extract the driving voltage Device Vp for driving the active slave device 300 from the power pulse VL received from the host device 100. The voltage adjustment unit 330 transmits the extracted driving voltage Device Vp to the active device driving unit 350 of the active slave device 300. Since the received power pulse VL is in the form of the driving voltage Device Vp covered with a digital data pulse, the driving voltage Device Vp can be easily extracted by a simple voltage divider circuit.

The active device driving unit 350 includes at least one active device, which is used for the active slave device 300 to perform a new function.

The active device may operate with the driving voltage Device Vp extracted from the received power pulse VL. Also, the active device receives host data from the slave power communication unit 320 via the input terminal DEVICE_DIN of the active device driving unit 350 and transmits slave data regarding the driving of the active device to the slave power communication unit 320 via the output terminal DEVICE_DOUT of the active device driving unit 350.

The active device may be, for example, an ANC solution, a bone conduction microphone, a 3D sound device (?), a digital microphone, a sensor, or a device for use in RF control, but the present disclosure is not limited thereto. That is, the active device may be any device included in a slave device that requires the supply of power.

Figure 14A:
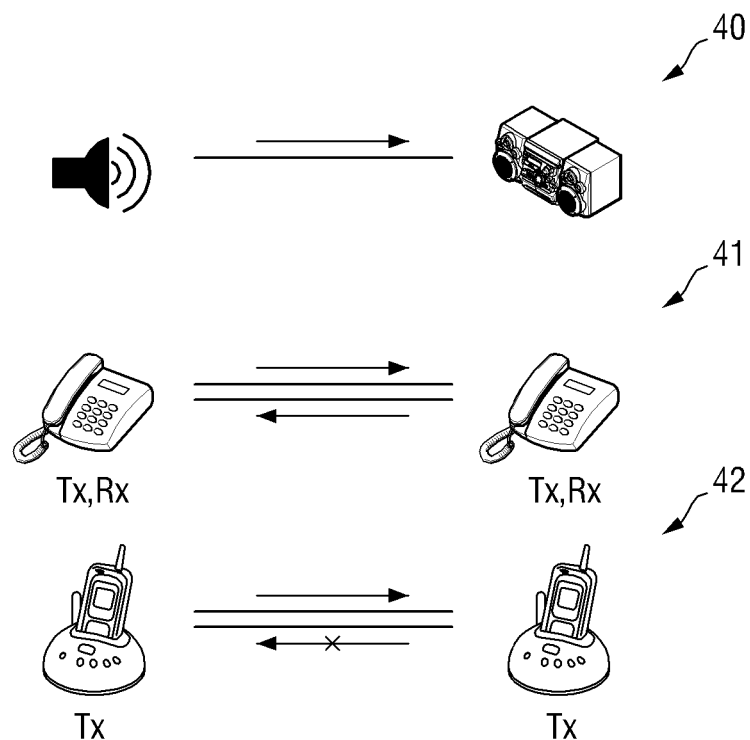
FIG. 14A is a schematic view illustrating conventional communication methods.

FIG. 14A is a schematic view illustrating conventional communication methods.

Various communication methods used in existing communication systems will hereinafter be described with reference to FIG. 14A. A data communication method is classified into a simplex, full-duplex, or half-duplex communication method.

Referring to FIG. 14A, reference numeral 40 represents a simplex communication method. In the simplex communication method, a host device can only operate in a transmission mode, and a slave device can only operate in a reception mode. The simplex communication method is generally used in a system where slave devices are not particularly required to respond to signals from their host device. The simplex communication method is also used in devices such as a typical radio or a beeper.

Reference numeral 41 represents a full-duplex communication method. In the full-duplex communication method, simultaneous bidirectional data transmission can be performed between a host device and a slave device. To enable simultaneous bidirectional data transmission, two pairs of transmission lines for data transmission and data reception, respectively, are needed. Thus, a full-duplex communication line is configured as a 4-wire transmission line. However, full-duplex communication can be performed via a 2-wire transmission line by using a technique such as time division duplexing (TDD), frequency division duplexing (FDD), or echo canceling. The full-duplex communication method is used in telephone communication and high-speed data communication. The full-duplex communication method enables bidirectional data transmission via multiple lines and has advantages such as high transmission speed and wide bandwidth. However, due to the use of the multiple lines, the implementation of the full-duplex communication method is generally costly.

Reference numeral 42 represents a half-duplex communication method. In the half-duplex communication method, bidirectional data transmission can be performed between a host device and a slave device, but only one-way data transmission can be performed at any given time. More specifically, if the host device operates in a transmission mode, the slave device operates in a reception mode. On the other hand, if the host device operates in a reception mode, the slave device operates in a transmission mode. Since the host device and the slave device cannot transmit signals to and receive signals from each other at the same time, the bandwidth for data transmission may decrease, but bidirectional communication can be performed simply via a single transmission line. For an efficient half-duplex communication, switching between a transmission mode and a reception mode needs to be effectively performed. Thus, the design of a polling signal for inducing switching between communication modes is highly important. The half-duplex communication method is commonly used in computer channels.

The present disclosure provides power communication using a single microphone line 311, and particularly, a method for half-duplex power communication between the host communication module 200 and the active slave device 300.

Figure 14B:
FIG. 14B is a schematic view illustrating a conventional method for half-duplex power communication between a host device and a slave device.

FIG. 14B is a schematic view illustrating a conventional method for half-duplex power communication between a host device and a slave device.

In a case in which digital communication is performed with a voltage applied via a single power line such as the microphone line 311, only one voltage can be encoded with the single power line. Thus, full-duplex bidirectional communication cannot be realized.

Referring to FIG. 14B, reference character Tx denotes a case in which the host device 100 operates in a transmission mode, and reference character Rx denotes a case in which the host device 100 operates in a reception mode.

In a case in which the host device 100 operates in a transmission mode Tx, the active slave device 300 needs to operate in a reception mode Rx. On the other hand, in a case in which the host device 100 operates in the reception mode Rx, the active slave device 300 needs to operate in the transmission mode Tx. This is a natural way of allocating communication modes in a half-duplex mode.

FIG. 14B illustrates changes in the communication mode of the host device 100 in a conventional half-duplex mode. Referring to FIG. 14B, the duration for which the transmission mode Tx is continued is the same as the duration for which the reception mode Rx is continued. According to the conventional half-duplex mode, the host device 100 is designed to alternately operate in the transmission mode Tx and the reception mode Rx at regular intervals of time.

In a case in which the host device 100 alternately operates in the transmission mode Tx and the reception mode Rx at regular intervals of time, the active slave device 300 can anticipate when mode switching will occur. Accordingly, the active slave device 300 can realize data communication with high predictability.

However, in the communication method of FIG. 14B, the communication mode of the host device 100 needs to be switched at regular intervals of time even when the host device 100 does not have data to transmit, but only has data to receive. Thus, the communication method of FIG. 14B reduces the bandwidth for data communication.

Figure 14C:
FIG. 14C is a schematic view illustrating a method for half-duplex power communication between a host device and a slave device, according to some exemplary embodiments of the present disclosure.

FIG. 14C is a schematic view illustrating a method for half-duplex power communication between the host device 100 and the active slave device 300, according to some exemplary embodiments of the present disclosure.

A method for power communication between the host communication module 200 and the active slave device 300, according to some exemplary embodiments of the present disclosure, will hereinafter be described with reference to FIG. 14C. To reduce bandwidth loss, the communication mode of the host communication module 200 may be switched according to the needs of each of the host communication module 200 and the slave device 300. Referring to FIG. 14C, the duration for which the transmission mode Tx is continued may not be the same as the duration for which the reception mode Rx is continued.

In the present exemplary embodiment, the communication mode of the host device 100 is elastically switched as necessary, thereby securing additional bandwidth. In a case in which the host communication module 200 operates in the transmission mode Tx, the host communication module 200 may transmit a polling signal to the active slave device 300 through power communication.

In a case in which the host device 100 is switched from the transmission mode Tx to the reception mode Rx, the host device 100 may transmit a polling signal to the active slave device 300 in the form of digital data. Since the driving of the active slave device 300 is dependent upon the host device 100, the communication mode of the active slave device 300 may be determined by the host device 100. The host device 100 may have the transmission mode Tx as its default communication mode.

In a case in which the host device 100 operates in the reception mode Rx, digital data is received from the active slave device 300. During the reception of the digital data from the active slave device 300, the host communication module 200 cannot transmit a polling signal to the active slave device 300 through power communication even if mode switching is requested by the host device 100.

To address this problem, a method is suggested in which the host device 100 transmits a polling signal to the active slave device via the microphone line 311 when the active slave device 300 performs power communication with the host communication module 200.

To prevent data loss, the host device 100 and the active slave device 300 are required to continue to perform power communication even during the application of a polling signal to the active slave device 300. Accordingly, the polling signal needs to be encoded in a power pulse VL that carries data and power in a manner that does not cause damage to the data and the power.

The polling signal is encoded by the host current fluctuation generator 211. The host current fluctuation generator 211 may receive a control signal for controlling the communication mode of the host device 100 from the host device 100.

If there is the need to suddenly switch the communication mode of the host device 100 to the transmission mode Tx during the reception of data from the active slave device 300 through power communication, the host communication module 200 induces the host power communication unit 210 to transmit the polling signal with the use of the control signal.

Figure 15:
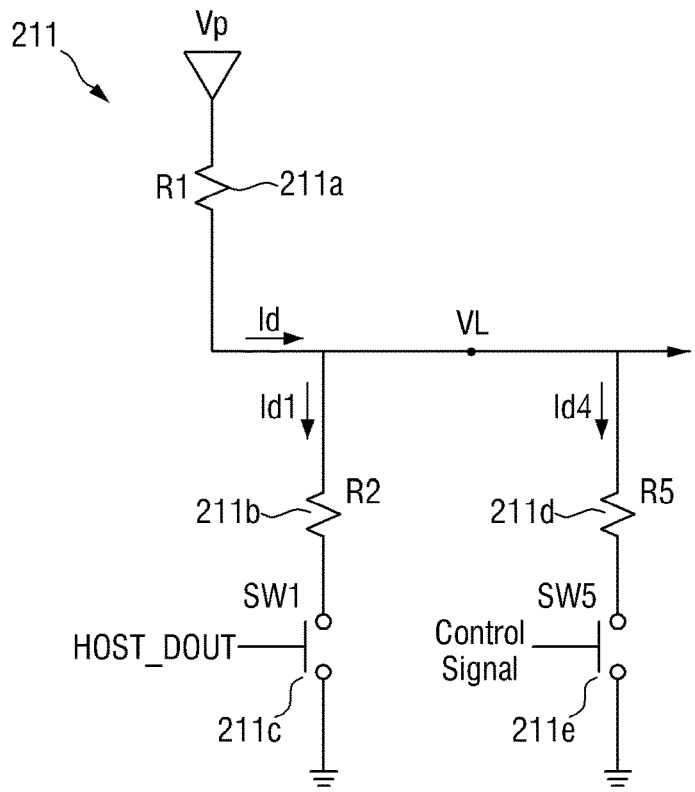
FIG. 15 is a detailed circuit diagram of the host current fluctuation generator of FIG. 6.

FIG. 15 is a detailed circuit diagram of the host current fluctuation generator 211 of FIG. 6.

Figure 16:
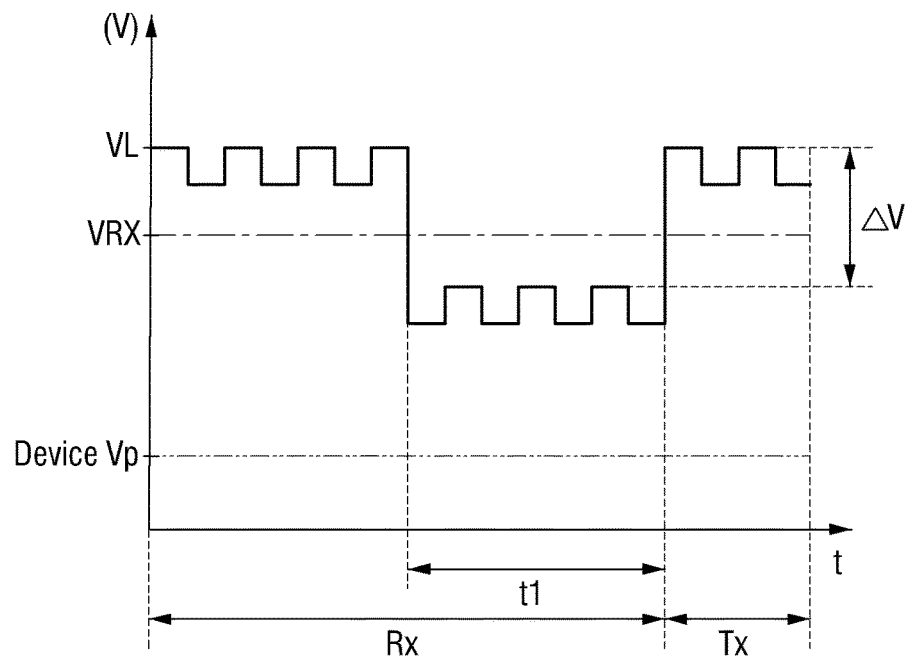
FIG. 16 is a graph for explaining a method of transmitting a polling signal using a voltage drop, according to some exemplary embodiments of the present disclosure.

FIG. 16 is a graph for explaining a method of transmitting a polling signal using a voltage drop, according to some exemplary embodiments of the present disclosure.

It will hereinafter be described how the host device 100 transmits a polling signal to the active slave device 300 with reference to FIGS. 15 and 16. Referring to FIG. 15, the host current fluctuation generator 211 may include a switch SW5 (211e) and a load R5 (211d), which are connected in parallel to the switch SW1 (211c) and the load R2 (211b), respectively, that are provided to encode host data, and the switch SW5 (211e) and the load R5 (211d) are controlled by a control signal Control Signal.

In order to transmit a polling signal to the active slave device 300, the host communication module 200 may temporarily lower the voltage of a power pulse VL.

Since the power pulse VL is required to transmit not only data, but also the driving voltage Device Vp of the active slave device 300, the host current fluctuation generator 211 cannot limitlessly lower the voltage of the power pulse VL. A voltage based on which the active slave device 300 can recognize a polling signal is defined as a threshold voltage VRX. If the voltage of the power pulse VL drops to a level below the threshold voltage VRX for as long as a predefined period t1, the active slave device 300 may determine that the host device 100 is requesting mode switching.

The threshold voltage VRX may satisfy Equation 3 below.

$$\text{Voltages } V1 \text{ and } V2 \text{ of Power Pulse } VL \text{ during Power Communication} > \text{Threshold Voltage } VRX > \text{Driving Voltage Device } Vp. \quad \text{[Equation 3]}$$

The voltages V1 and V2 may be 2.4 V and 2.6 V, respectively, and the driving voltage Device Vp may be 1.96 V. In this case, the threshold voltage VRX may be 2.2 V.

FIG. 16 illustrates the reception of a polling signal during the operation of the host device 100 in the reception mode Rx. Referring to FIG. 16, digital data communication is also performed via a power pulse VL, the voltage of the power pulse VL fluctuates according to digital data transmitted via the power pulse VL.

The switch SW5 (211e) of the host current fluctuation generator 211 is closed in response to the control signal Control Signal being applied. Then, an additional leakage current Id4 is generated due to the switch SW5 (211e) and the load R5 (211d). Due to the additional leakage current Id4, an additional drop ΔV occurs in the voltage of the power pulse VL.

The switch SW5 (211e) operates for as long as the period t1. In response to the voltage drop ΔV being detected, the active slave device 300 is switched to the reception mode Rx and receives host data from the host device 100. The period t1 after the occurrence of the voltage drop ΔV, the host device 100 operates in the transmission mode Tx.

In response to a polling signal being received, the active slave device 300 is switched from the transmission mode Tx to the reception mode Rx and prepares the slave voltage fluctuation detector 321 to operate. The host device 100 is switched from the reception mode Rx to the transmission mode Tx.

Figure 17A:
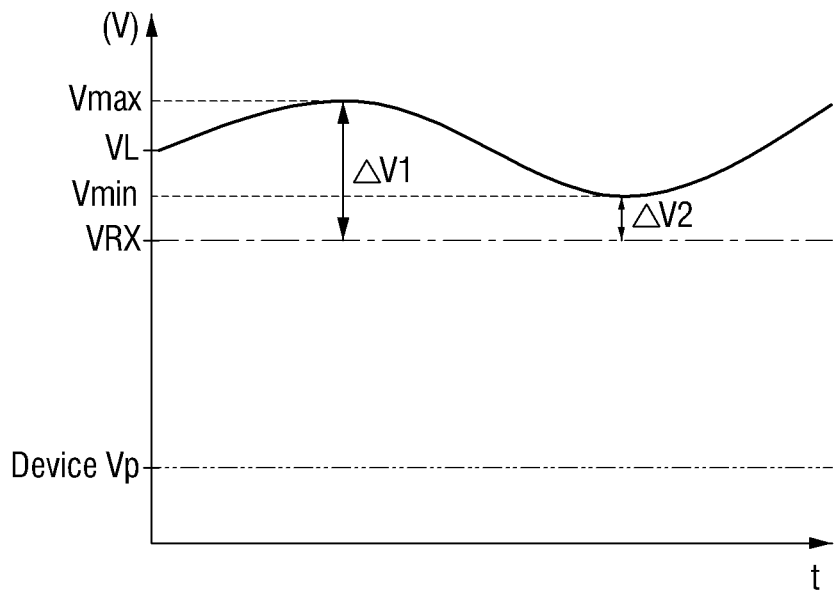
FIG. 17A is a graph showing the waveform of power communication between a host device and a slave device, according to some exemplary embodiments of the present disclosure.

FIG. 17A is a graph showing the waveform of power communication between the host device 100 and the active slave device 300, according to some exemplary embodiments of the present disclosure.

The waveform of a power pulse VL in an actual circuit will hereinafter be described with reference to FIG. 17A. The host device 100 supplies a uniform direct current (DC) power voltage HOST Vp to the active slave device 300, but in reality, the power pulse VL fluctuates in a different manner from that illustrated in FIG. 16 due to various active devices present in the active slave device 300. For convenience, the waveform of a power pulse VL for digital data wave form is not illustrated in FIG. 17A.

As mentioned above, by using the voltage drop ΔV in the power pulse VL, a polling signal can be transmitted to the active slave device 300 during power communication. However, if the power pulse VL fluctuates as illustrated in FIG. 17A, it is difficult to determine the amount by which the voltage of the power pulse VL should drop to reach a level below the threshold voltage VRX, i.e., the amount of the voltage drop ΔV.

More specifically, in a case in which the power pulse VL has a maximum voltage Vmax due to the active devices present in the active slave device 300, a minimum of a voltage drop amount ΔV1 is needed for the host device 100 to transmit a polling signal to the active slave device 300.

On the other hand, in a case in which the power pulse VL has a minimum voltage Vmin, a minimum of a voltage drop amount ΔV2 is needed for the host device 100 to transmit a polling signal to the active slave device 300.

That is, if the voltage of the power pulse VL fluctuates due to the active devices present in the active slave device 300, the amount by which the voltage of the power pulse VL should drop to reach a level below the threshold voltage VRX, i.e., the amount of the voltage drop ΔV, varies, and thus, a polling signal cannot be transmitted with a uniform amount of the voltage drop ΔV.

More specifically, problems may arise when the amount of the voltage drop ΔV is between ΔV1 and ΔV2.

In a case in which mode switching is requested when the power pulse VL has the minimum voltage Vmin, the voltage of the power pulse VL satisfies the following equation: VL=Vmin−ΔV<VRX. Thus, the active slave device 300 may properly recognize a polling signal.

On the other hand, in a case in which mode switching is requested when the power pulse VL has the maximum voltage Vmax, the active slave device 300 may not be able to properly recognize a polling signal because the voltage of the power pulse VL after the occurrence of a voltage drop in the power pulse VL satisfies the following equation: VL=Vmax−ΔV>VRX.

To address the problem associated with a case in which the power pulse VL has the maximum voltage Vmax, the voltage drop ΔV may be set to a very large value. In this case, however, the voltage of the power pulse VL satisfies the following equation: VL=Vmin−ΔV<Device Vp. Thus, the supply of power to the active slave device 300 may be terminated.

Figure 17B:
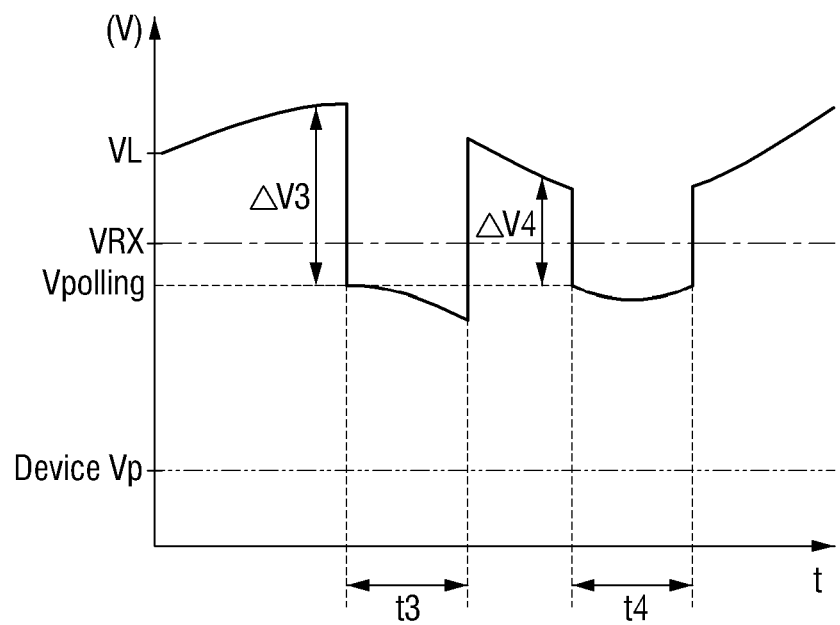
FIG. 17B is a graph for explaining a method of transmitting a polling signal using a voltage drop, according to some exemplary embodiments of the present disclosure.

FIG. 17B is a graph for explaining a method of transmitting a polling signal using a voltage drop, according to some exemplary embodiments of the present disclosure.

A solution to the problem described above with reference to FIG. 17A will hereinafter be described with reference to FIG. 17B. FIG. 17B shows a voltage drop amount ΔV3 for a case in which a power pulse VL has the maximum voltage Vmax and a voltage drop amount ΔV4 for a case in which a power pulse VL has the minimum voltage Vmin. The host current fluctuation generator 211 may adjust the voltage of a power pulse VL during period t3 and t4 when a polling signal is transmitted to satisfy Equation 4 below.

$$V\text{max}-\Delta V3=V\text{min}-\Delta V4=V\text{polling}. \quad \text{[Equation 4]}$$

The host current fluctuation generator 211 addresses the problem described above with reference to FIG. 17A by allowing the voltage of the power pulse VL to drop only to a voltage Vpolling regardless of the variation of the voltage of the power pulse VL. The aforementioned device information may be used as reference for setting the voltage Vpolling.

Figure 18:
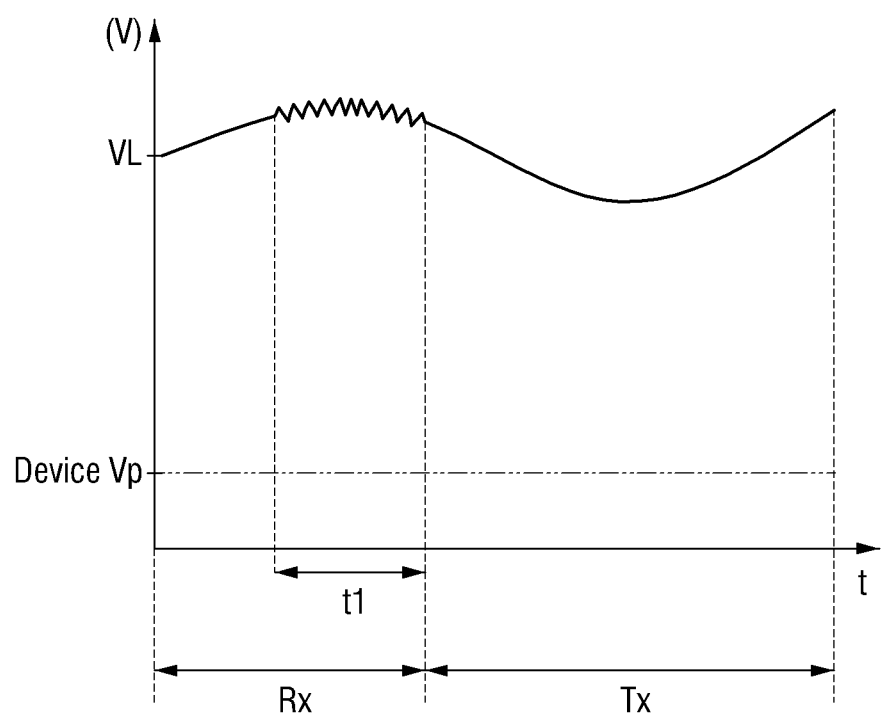
FIG. 18 is a graph for explaining a method of transmitting a polling signal using a variation in frequency, according to some exemplary embodiments of the present disclosure.

FIG. 18 is a graph for explaining a method of transmitting a polling signal using a variation in frequency, according to some exemplary embodiments of the present disclosure.

In a case in which a polling signal is transmitted using a voltage drop in a power pulse VL, the transmission of a polling signal may fail not only due to the variation of the threshold voltage VRX of the active slave device 300, but also due to the variation of the power pulse VL caused by the active devices present in the active slave device 300.

Also, a voltage drop in a power pulse VL may directly affect the operation of the active slave device 300. Thus, the transmission of a polling signal using an additional voltage drop in a power pulse VL involves risks to the stability of the active slave device 300.

To address the problems associated with the transmission of a polling signal with the use of a voltage drop in a power pulse VL, a new method to transmit a polling signal is suggested. The host current fluctuation generator 211 applies a predefined frequency to a power pulse VL, instead of using a voltage drop in a power pulse VL, and may use the predefined frequency as a polling signal. The predefined frequency is different from a clock frequency for transmitting data to the active slave device 300 using a power pulse VL.

FIG. 18 illustrates a situation in which the host device 100 is switched to the transmission mode Tx in the middle of operating in the reception mode Rx. The frequency of a power pulse VL fluctuates for as long as a period t1 during the operation of the host device 100 in the reception mode Rx. After the fluctuation of the frequency of the power pulse VL, the host device 100 is switched to the transmission mode Tx.

The active slave device 300 may detect a variation in the frequency of the power pulse VL and may determine that the communication mode of the host device 100 has been switched. In response to a polling signal being received in the form of a frequency, the active slave device 300 is switched from the transmission mode Tx to the reception mode Rx and prepares the slave voltage fluctuation detector 321 to operate.

In a case in which a polling signal is realized using a frequency, signal recognition failure that may be caused by a voltage drop in the power pulse VL may be prevented. Thus, the problems associated with the transmission of a polling signal using a voltage drop in the power pulse VL may be addressed. However, the structure of circuitry realizing a polling signal using a frequency may be more complicated than the structure of circuitry simply causing a voltage drop in the power pulse VL to transmit a polling signal.

The structure of the active slave device 300 will hereinafter be described in further detail with reference again to FIG. 9. Referring to FIG. 9, the active slave device 300, which performs power communication using a power pulse VL, may further include a passive circuit 312, an active-to-passive (A/P) switching switch 360, and an A/P packet generation unit 370.

Figure 19:
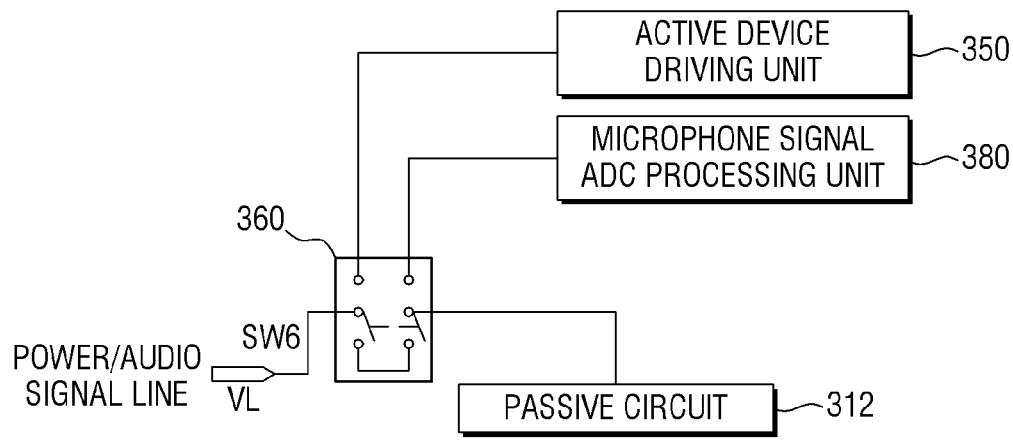
FIG. 19 is a circuit diagram of an active-to-passive (A/P) switching switch illustrated in FIG. 9.

FIG. 19 is a circuit diagram of the A/P switching switch 360 of FIG. 9.

The A/P switching switch 360 may selectively convert the active slave device 300 to be available for use as a passive slave device.

Existing ANC earphones are equipped with a console for performing an ANC function. The console device is provided with an embedded battery for driving an ANC chip. The existing ANC earphones are connected to a host device via a 4-pole audio jack. The existing ANC earphones are not supplied with power via a microphone line. The ANC function is realized by providing an additional battery, and the microphone line is used in connection with a microphone or for detecting a key input.

The existing ANC earphones are also equipped with a switch for controlling the ANC function. If the switch is turned off, the ANC function is terminated. The switch may inactivate the use of the additional function of the existing ANC earphones and may thus reduce the battery power consumption of the existing ANC earphones.

In a case in which the battery of the existing ANC earphones is used up, the existing ANC earphones operate as typical passive earphones and allow the user to use the minimum function of typical earphones.

The ANC function of the existing ANC earphones is controlled not by manipulating a host device, but by manipulating a remote control additionally provided in the existing ANC earphones.

Since the host communication module 200 performs power communication with the active slave device 300, the host device 100 can supply power to, and at the same time, perform power communication with, the active slave device 300.

A bias voltage is needed to operate a passive slave device, but the amount of current required by a passive slave device is generally very small. Thus, the amount of power consumed by the host device 100 due to the bias voltage may be much smaller than the amount of power consumed by the host device 100 when the active slave device 300 is connected to the host device 100.

To reduce the power consumption of the host device 100 in power communication, a configuration is needed to allow the active slave device 300 to operate in a passive mode as necessary. To this end, the A/P switching switch 360 is provided.

The A/P switching switch 360 applies an active circuit and a passive circuit 312, which are provided in the active slave device 300 and are physically separate from each other, to the microphone line 311. The active circuit may include the slave power communication unit 320, the voltage adjustment unit 330, and the active device driving unit 350.

It is assumed that the active slave device 300 is ANC earphones equipped with an ANC function. The active device driving unit 350 of the ANC earphones includes a device for performing the ANC function, a small microphone for use in the ANC function, and a microphone signal analog-to-digital conversion (ADC) processing unit 380. The passive circuit 312 includes a typical microphone and a key detection circuit.

The ANC function will hereinafter be described. The ANC earphones include a typical microphone for use in a call and a small microphone for use in noise cancellation. The small microphone receives ambient noise to perform the ANC function. The small microphone is included in an active device driving unit and is thus driven not by a bias voltage from the host device 100, but by an additional power source provided in the ANC earphones.

Sound consists of sound waves. The ANC earphones generate sound waves that are opposite to the ambient noise and add the generated sound waves to the output thereof. A user actually hears both the ambient noise and the sound waves opposite to the ambient noise at the same time and feels as if the ambient noise disappears because of the destructive interference between the ambient noise and the sound waves opposite to the ambient noise.

The differences between conventional ANC earphones and the ANC earphones, which are an exemplary active slave device according to the present disclosure, will hereinafter be described. The ANC earphones are not equipped with an additional power source because they can be supplied with power by the host device 100 through power communication with the host device 100. Also, the host device 100 can digitally communicate with the ANC earphones and can thus directly control the operation of the ANC earphones. Since no particular power source is additionally provided for the ANC earphones, the console for the ANC earphones can be miniaturized.

Since the ANC earphones can transmit digital data to the host device 100, the ANC earphones can transmit various device information and state information regarding the ANC function to the host device 100. By using an application provided in the host device 100 and the device information and the state information, the operation of the ANC earphones can be efficiently controlled.

The A/P switching switch 360 of the ANC earphones will hereinafter be described. The A/P switching switch 360 selectively connects particular circuitry to a microphone jack so as for a passive circuit function of the ANC earphones to be available. The A/P switching switch 360 may be implemented in the form of a physical switch attached on the microphone of the ANC earphones, but the present disclosure is not limited thereto. The A/P switching switch 360 is not particularly limited to being provided in the ANC earphones.

In other words, any slave device equipped with both a passive circuit that does not require the supply of power and an active circuit that requires the supply of power may be provided with the A/P switching switch 360.

Since the ANC earphones correspond to an active slave device, the attribute recognition unit 230 of the host communication module 200 identifies the ANC earphones as being an active slave device in response to the ANC earphones being connected to the microphone jack of the host device 100, and configures circuitry so as for the host device 100 to perform power communication with the ANC earphones.

In a case in which the user switches the ANC earphones to a passive mode with the use of the A/P switching switch 360 to reduce the battery use of the host device 100 or not to use the ANC function of the ANC earphones, the ANC earphones may operate as typical passive earphones equipped with a microphone and a speaker.

Referring to FIG. 19, a switch SW6 (360) corresponds to the A/P switching switch 360. In response to the ANC earphones being set to a passive mode by the A/P switching switch 360, the A/P switching switch 360 applies the passive circuit 312 of the ANC earphones to the microphone line 311. Since the ANC earphones can perform the basic function of typical earphones, the structure of the passive circuit 312 is not much different from the structure of typical earphones. In FIG. 19, the active device driving unit 350 and the microphone signal ADC processing unit 380 are illustrated as part of the active circuit of the ANC earphones.

Since the ANC function of conventional ANC earphones can be directly controlled with the conventional ANC earphones, there is no need to transmit microphone input for use in noise cancellation to the host device 100. However, as mentioned above, for a detailed control of the operation of the conventional ANC earphones, the microphone input needs to be transmitted to the host device 100.

To address the problems associated with the conventional ANC earphones, the microphone signal ADC processing unit 380 converts a signal received via the microphone of the ANC earphones into a digital signal. The digital signal is then transmitted to the host power communication unit 210.

In a case in which the host device 100 performs data communication with the ANC earphones through power communication, the basic function of the microphone of the ANC earphones, i.e., transmitting a voice signal and a key input signal to the host device 100, may not be able to be performed via the microphone line 311. The microphone signal ADC processing unit 380 may convert not only microphone input from an ANC microphone for noise cancellation, but also analog voice and key input signals from a typical microphone, into digital signals.

The D/A signal converter 213 of the host power communication unit 210 of FIG. 9 will hereinafter be described.

It is highly important to secure compatibility with existing devices in the process of developing a new type of host-slave system.

In a case in which the ANC earphones are connected to the host device 100, an ANC microphone input signal As mentioned above, microphone input is converted into digital data by the microphone signal ADC processing unit 380, and the digital data is transmitted to the host device 100. In order for the host device 100 to receive the microphone input, the host device 100 needs to be equipped with its own D/A signal converter or a D/A signal conversion program.

In order to make the host device 100 compatible with the ANC earphones, the host power communication unit 210 may further include the D/A signal converter 213. The D/A signal converter 213 receives an ANC microphone input signal in the form of a digital pulse from the host voltage fluctuation detector 212. The microphone input signal is converted back into its original form by the D/A signal converter 213 and is then transmitted to the host device 100.

The conversion of microphone input from an ANC microphone into an analog signal by the D/A signal converter 213 is exemplary. The D/A signal converter 213 may convert not only microphone input from an ANC microphone, but also analog voice and key input signals from a typical microphone, into digital signals.

The host device 100 includes the D/A signal converter 213 and can thus be compatible with ordinary host device.

The present disclosure has been described taking microphone input from an ANC microphone as an example of a target signal for the D/A signal converter 213. However, the present disclosure is not limited to microphone input from an ANC microphone. In a case in which the host device 100 is required to transmit an analog signal in the form of a digital signal for power communication, the D/A signal converter 213 may be used. The host communication module 200 includes the D/A signal converter 213 and can thus secure compatibility for the host device 100.

In a case in which the ANC earphones, which can operate in a passive mode with the aid of the A/P switching switch 360, are connected to the host device 100, the host communication module 200 identifies the ANC earphones as passive earphones, receives an analog microphone input signal and a key detection signal from the ANC earphones, and provides the analog microphone input signal and the key detection signal to the host device 100.

A case in which the ANC earphones are connected to the host device 100 when set to a passive mode by the A/P switching switch 360 has been described above. The host communication module 200 determines the attribute of the ANC earphones at the moment when the ANC earphones are connected to the host device 100. Thus, in a case in which the user attempts to switch the operating mode of the ANC earphones when the ANC earphones are already connected to the host device 100, the host device 100 needs to determine the attribute of the ANC earphones using a different method from that described above.

In a case in which the ANC earphones are connected to the host device 100 when set to a passive mode by the A/P switching switch 360, the A/P switching switch 360 may be used to use the ANC function. In response to the ANC earphones being switched to an active mode by the A/P switching switch 360, a sudden electric connection is established between the host communication module 200 and the attribute setting unit 340. The host communication module 200 may determine based on the electric connection between the host communication module 200 and the attribute setting unit 340 that new earphones have been connected to the host device 100. Then, the host device 100 may detect a change in the attribute of the ANC earphones using the attribute recognition unit 230 of the host communication module 200.

On the other hand, in a case in which the ANC earphones are connected to the host device 100 when set to an active mode by the A/P switching switch 360, the A/P switching switch 360 may be used to terminate the use of the ANC function. In response to the ANC earphones being switched to a passive mode by the A/P switching switch 360, power communication between the host device 100 and the ANC earphones is suddenly terminated. The host communication module 200 may detect a change in the attribute of the ANC earphones based on the sudden termination of the power communication between the host device 100 and the ANC earphones.

Another case in which the ANC earphones are connected to the host device 100 when set to an active mode by the A/P switching switch 360 and perform power communication in an idle mode with the host device 100 will hereinafter be described. An idle mode denotes a state in which an active device temporarily stops operating to reduce power consumption. In a case in which the host device 100 and the ANC earphones are connected in an idle mode, no data communication is performed.

In this case, even if the ANC earphones are suddenly switched to a passive mode by the A/P switching switch 360, the host device 100 may not be able to properly detect a change in the operating mode of the ANC earphones.

Figure 20:
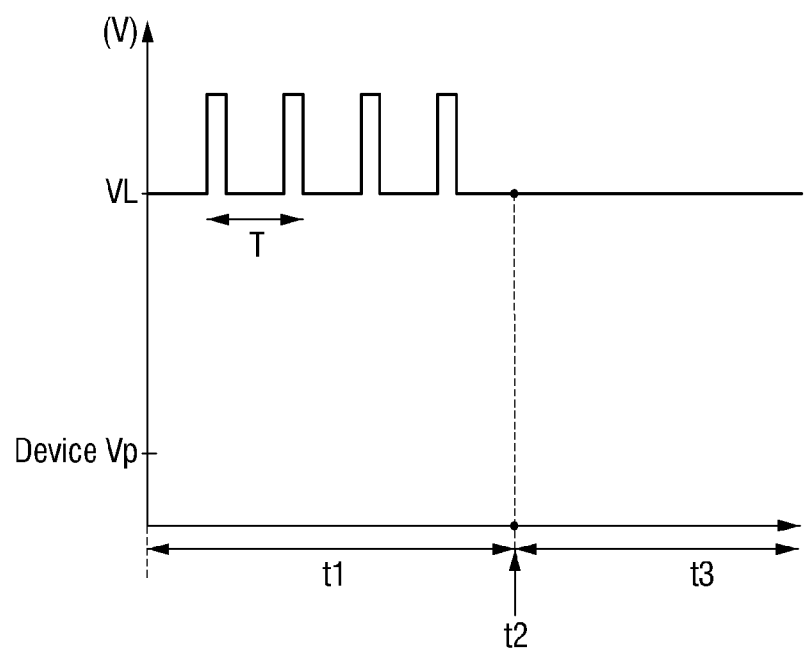
FIG. 20 is a graph for explaining a method of recognizing the attribute of an active slave device in real time using alive packet data, according to some exemplary embodiments of the present disclosure.

FIG. 20 is a graph for explaining a method of recognizing the attribute of an active slave device in real time using alive packet data, according to some exemplary embodiments of the present disclosure.

To address the problems associated with a case in which the active slave device 300, set to an active mode by the A/P switching switch 360, is connected to the host device 100 and performs power communication in an idle mode with the host device 100, the active slave device 300 may further include the A/P packet generation unit 370. The A/P packet generation unit 370 receives operating mode information of the active slave device 300 from the A/P switching switch 360.

The operating mode information includes information indicating whether the active slave device 300 has currently been made by the A/P switching switch 360 to operate either in an active mode or a passive mode.

The A/P packet generation unit 370 is driven when the active slave device 300 is connected in an active mode to the host device 100 and performs power communication in an idle mode with the host device 100. The A/P packet generation unit 370 allows the slave power communication unit 320 to periodically transmit alive packet data to the host device 100.

The alive packet data is a signal for determining whether the active slave device 300 is currently "alive" in an active mode and may be in the form of a periodic pulse signal, but the present disclosure is not limited thereto. The slave power communication unit 320 transmits the alive packet data to the host power communication unit 210 of the host communication module 200. In a case in which the active slave device 300 is switched from an active mode to a passive mode by the A/P switching switch 360, the A/P packet generation unit 370 stops transmitting the alive packet data.

The real-time attribute recognizer 214 of the host power communication unit 210 of FIG. 9 will hereinafter be described.

The host voltage fluctuation detector 212 decodes the alive packet data transmitted by the A/P packet generation unit 370. The real-time attribute recognizer 214 receives the alive packet data and determines whether there has been a change in the attribute of the active slave device 300. In a case in which the host device 100 and the active slave device 300 perform power communication in an idle mode, the active slave device 300 continues to transmit the alive packet data. The real-time attribute recognizer 214 recognizes the alive packet data and determines that there has not been a change in the attribute of the active slave device 300.

In a case in which the active slave device 300 is switched from an active mode to a passive mode by the A/P switching switch 360 while performing power communication in an idle mode, the transmission of the alive packet data by the A/P packet generation unit 370 is terminated. The real-time attribute recognizer 214 detects the termination of the transmission of the alive packet data and thus determines that the active slave device 300 has been switched to a passive mode.

In a case in which mode switching occurs, the host communication module 220 allows the switch SW2 of the terminal connection unit 220 to electrically connect the bias voltage Vd and the microphone line 311. Then, the operation of the host power communication unit 210 is terminated, and the host device 100 stops performing power communication.

The alive packet data transmitted by the A/P packet generation unit 370 will hereinafter be described with reference to FIG. 20. FIG. 20 shows the variation of the voltage of a power pulse VL during power communication in an idle mode between the host device 100 and the active slave device 300. Referring to FIG. 20, a period t1 denotes a period for which the active slave device 300 operates in an active mode. Since power communication is performed in an idle mode, the host device 100 transmits the power voltage HOST Vp to the active slave device 300 using the power pulse VL without transmitting host data to the active slave device 300.

During the period t1, the active slave device 300 transmits a power pulse VL having a predetermined period T to the host device 100, and this means that the active slave device 300 operates in an active mode. At a time t2, the active slave device 300 is switched to a passive mode by the A/P switching switch 360. In response to the active slave device 300 being switched to a passive mode, the A/P packet generation unit 370 stops transmitting the alive packet data. During a period t3, the active slave device 300 does not transmit the alive packet data.

The real-time attribute recognizer 214 determines whether the alive packet data is transmitted at intervals of the period T. In response to the transmission of the alive packet data from the active slave device 300 being terminated at the time t2, the real-time attribute recognizer 214 controls the host device 100 to stop performing power communication. During the period t3 that follows the termination of the power communication between the host device 100 and the active slave device 300, the host device 100 may apply a bias voltage for driving a passive slave device using the switch SW2 of the terminal connection unit 220.

Due to the presence of the real-time attribute recognizer 214 and the A/P packet generation unit 370, the user can change the attribute of the active slave device 300 in real time and can thus reduce the power consumption of the host device 100.

Figure 21:
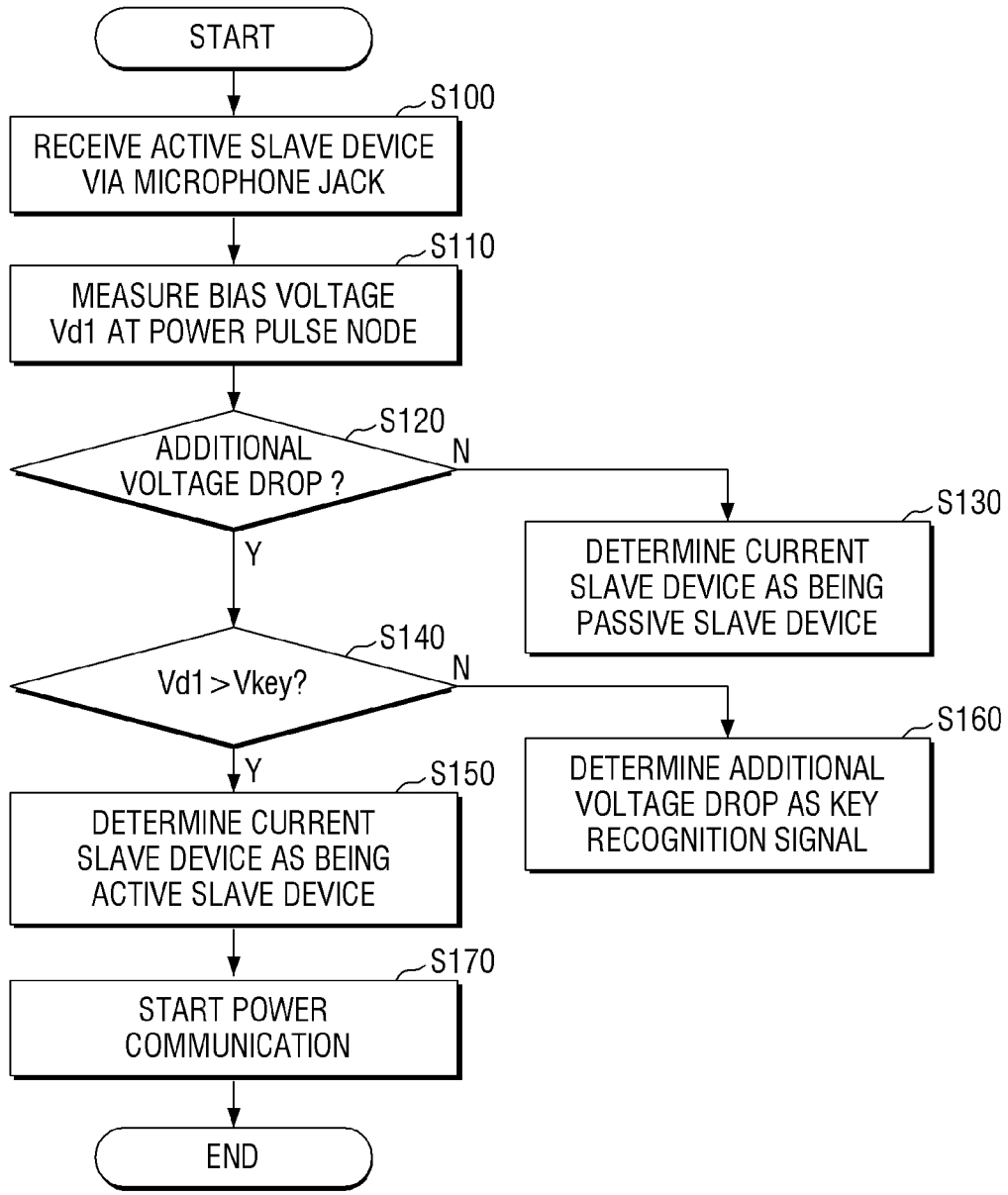
FIG. 21 is a flowchart illustrating a method of recognizing the attribute of a slave device using a drop in a bias voltage, according to an exemplary embodiment of the present disclosure.

FIG. 21 is a flowchart illustrating a method of recognizing the attribute of a slave device using a drop in a bias voltage, according to an exemplary embodiment of the present disclosure.

An exemplary method of recognizing the attribute of a slave device according to the present disclosure will hereinafter be described with reference to FIG. 21.

Referring to FIG. 21, in response to an arbitrary slave device being inserted into the host device 100 equipped with the host communication module 200 (S100), the host communication module 200 begins to recognize the attribute of the arbitrary slave device. The arbitrary slave device may be either an active slave device that requires power and data communication or a passive slave device that does not require power and data communication.

In response to the arbitrary slave device being inserted into the host device 100, the attribute recognition unit 230 measures the bias voltage Vd1 at the power pulse node VL of the terminal connection unit 220 (S110). When the arbitrary slave device is connected to the host device 100, the bias voltage Vd1 is set to be lower than the regular bias voltage Vd from the host device 100 due to the internal impedance of the arbitrary slave device and the bias resistor Rd of the terminal connection unit 220. The regular bias voltage Vd from the host device 100 may generally be maintained to be 2.8 V, and the bias voltage Vd1 at the power pulse node VL of the terminal connection unit 220 may generally be 1.5 V to 2 V. However, the present disclosure is not limited to this.

The attribute recognition unit 230 determines whether there has been an additional voltage drop at the power pulse node VL of the terminal connection unit 220 (S120). In response to a determination being made that there has not been any additional voltage drop at the power pulse node VL of the terminal connection unit 220, the attribute recognition unit 230 determines the arbitrary slave device as being a passive slave device (S130).

In response to a determination being made that there has been an additional voltage drop at the power pulse node VL of the terminal connection unit 220, the attribute recognition unit 230 compares the bias voltage Vd1 at the power pulse node VL where the additional voltage drop has occurred with the key recognition voltage Vkey (S140). In response to the bias voltage Vd1 being lower than the key recognition voltage Vkey, the attribute recognition unit 230 determines the arbitrary slave device as being a passive slave device, and determines that the additional voltage drop has been caused by a key input signal from the passive slave device (S160). The key recognition voltage Vkey may generally be 0.2 V to 0.75 V, but the present disclosure is not limited thereto. The host device 100 performs an operation corresponding to the key input signal.

On the other hand, in a case in which the bias voltage Vd1 has dropped but is still higher than the key recognition voltage Vkey, the attribute recognition unit 230 determines the arbitrary slave device as being an active slave device (S160).

In a case in which the attribute recognition unit 230 determines the arbitrary slave device as being an active slave device, the attribute recognition unit 230 connects the host power communication unit 210 and the microphone jack of the host device 100 using the switch SW2 of the terminal connection unit 220. As a result, power communication between the host device 100 and the active slave device begins (S170).

Figure 22:
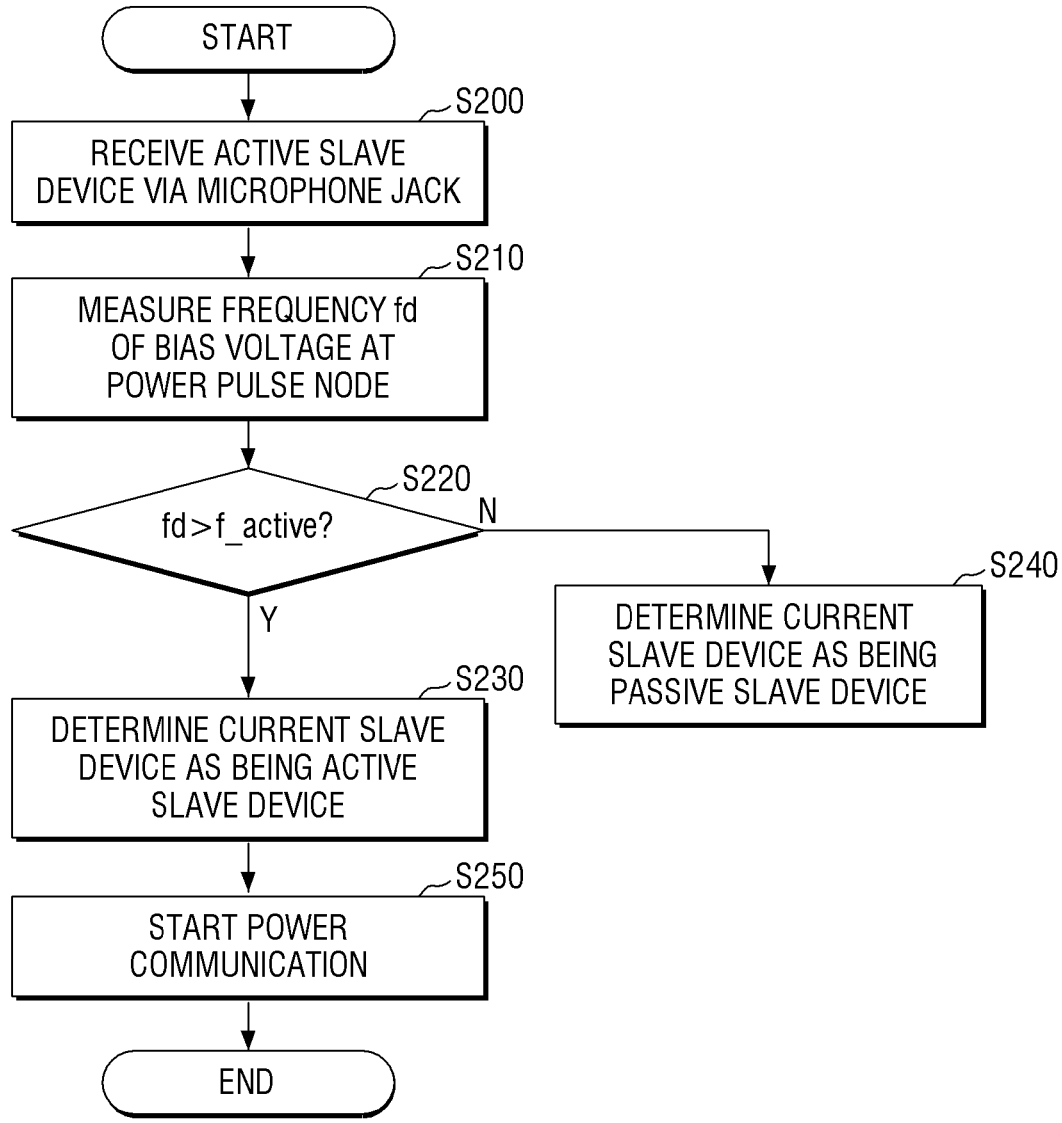
FIG. 22 is a flowchart illustrating a method of recognizing the attribute of a slave device using a variation in the frequency of a bias voltage, according to an exemplary embodiment of the present disclosure.

FIG. 22 is a flowchart illustrating a method of recognizing the attribute of a slave device using a variation in the frequency of a bias voltage, according to an exemplary embodiment of the present disclosure.

Another exemplary method of recognizing the attribute of a slave device according to the present disclosure will hereinafter be described with reference to FIG. 22.

The attribute recognition unit 230 may determine the attribute of the slave device currently connected to the host device 100 by measuring the frequency of the bias voltage Vd1, instead of a drop in the bias voltage Vd1.

Referring to FIG. 22, in response to an arbitrary slave device being inserted into the host device 100 equipped with the host communication module 200 (S200), the attribute recognition unit 230 measures a frequency fd of the bias voltage Vd1 at the power pulse node VL of the terminal connection unit 220 (S210).

In response to the frequency fd being lower than a predefined frequency f_active or no frequency variation being detected, the attribute recognition unit 230 determines the arbitrary slave device as being a passive slave device (S240).

On the other hand, in response to the frequency fd being higher than a predefined frequency f_active, the attribute recognition unit 230 determines the arbitrary slave device as being an active slave device (S230). The predefined frequency f_active may preferably be set to be lower than a frequency for use when the arbitrary slave device operates in a passive mode. For example, if the arbitrary slave device is, for example, earphones, the predefined frequency f_active may preferably be set to be lower than a minimum frequency for driving the microphone of the earphones.

In response to a determination being made that the arbitrary slave device is an active slave device, the attribute recognition unit 230 connects the host power communication unit 210 and the microphone jack of the host device 100 using the switch SW2 of the terminal connection unit 220. As a result, power communication between the host device 100 and the active slave device begins (S250).

Figure 23:
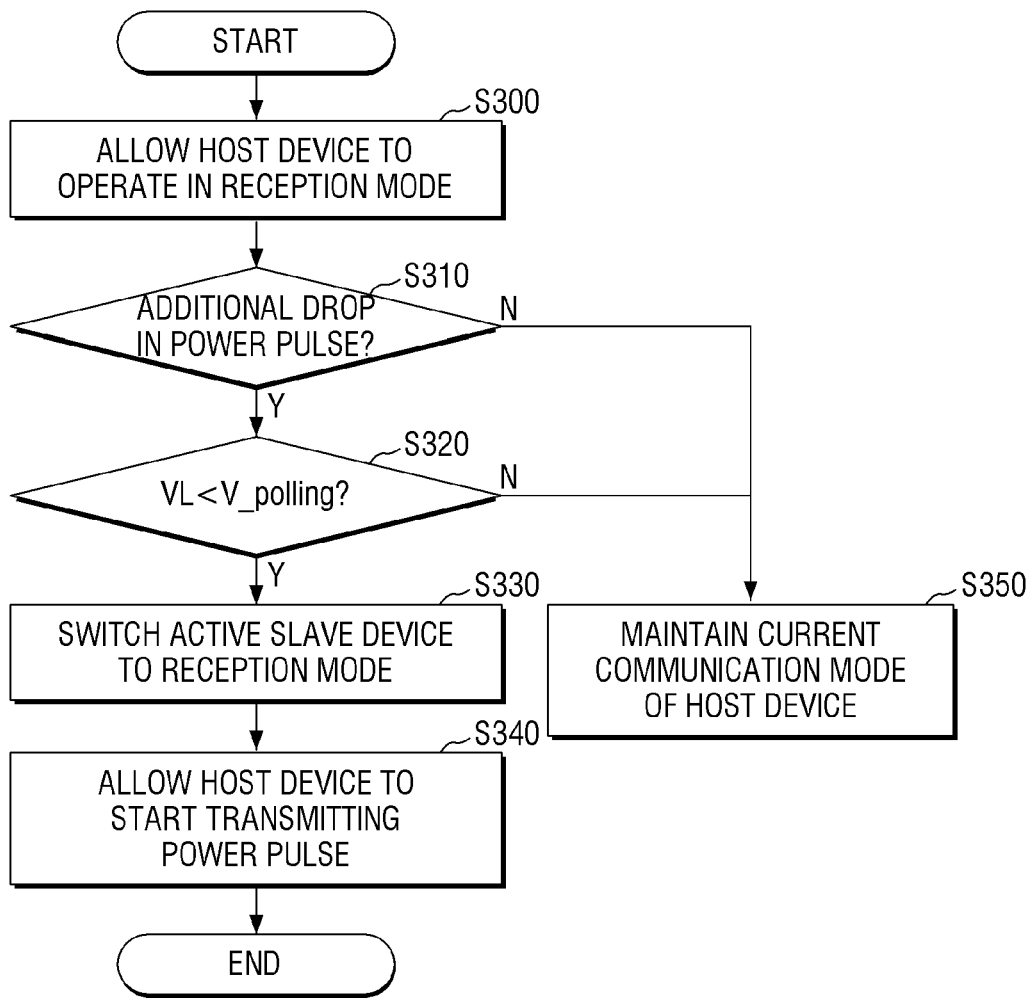
FIG. 23 is a flowchart illustrating a method of transmitting a half-duplex polling signal using a voltage drop, according to an exemplary embodiment of the present disclosure.

FIG. 23 is a flowchart illustrating a method of transmitting a half-duplex polling signal using a voltage drop, according to an exemplary embodiment of the present disclosure.

An exemplary method for half-duplex communication between the host device 100 and the active slave device 300 according to the present disclosure will hereinafter be described with reference to FIG. 23. For an efficient half-duplex communication, an efficient allocation of the transmission mode Tx and the reception mode Rx between the host device 100 and the active slave device 300 is needed.

According to a conventional method, the host device 100 may be set to alternately operate in the transmission mode Tx and the reception mode Rx at intervals of a predetermined period. However, this conventional method results in a reduction in bandwidth. To address this problem, a polling signal may be generated to switch the host device 100 between the transmission mode Tx and the reception mode Rx.

The host device 100 may have the transmission mode Tx as its default communication mode. Since the active slave device 300 operates under the control of the host device 100, the host device 100 may preferably have the transmission mode Tx as its default communication mode.

In a case in which the host device 100 operates in the transmission mode Tx, the host device 100 may transmit a polling signal to the active slave device 300 through power communication.

In a case in which the host device 100 operates in the reception mode Rx, the host device 100 cannot transmit a data signal to the active slave device 300. Thus, the host device 100 needs to encode a polling signal in a power pulse VL.

In a case in which data is transmitted from the active slave device 300 to the host device 100, the host device 100 operates in the reception mode Rx (S300). Due to the characteristics of half-duplex communication, the active slave device 300 operates in the transmission model Tx when the host device 100 operates in the reception model Rx.

In a case in which the host device 100 attempts to operate in the transmission mode Tx, the host current fluctuation generator 211 may cause an additional voltage drop in the power pulse VL. The active slave device 300 determines whether there has been a larger voltage drop in the power pulse VL than that caused by the transmission of digital data (S310). Step S310 may be performed by the slave voltage fluctuation detector 321.

In response to a determination being made that there has been a larger voltage drop in the power pulse VL than that caused by the transmission of digital data, the active slave device 300 determines whether the voltage of the power pulse VL is lower than the threshold voltage Vpolling of a polling signal (S320).

In actual circuitry, the voltage of the power pulse VL may fluctuate due to various active devices present in the active slave device 300. The host current fluctuation generator 211 may appropriately determine the amount of a voltage drop in the power pulse VL in consideration of the variation of the voltage of the power pulse VL caused by the active slave device 300. As a result, once the voltage of the power pulse VL drops, the voltage of the power pulse VL may be uniformly maintained regardless of fluctuations therein.

In response to a voltage drop in the power pulse VL being detected, the active slave device 300 stops transmitting data through power communication and is switched from the transmission mode Tx to the reception mode Rx (S330).

In response to the active slave device 300 being switched to the reception mode Rx, the host device 100 is switched from the reception mode Rx to the transmission mode Tx. Then, the host device 100 begins to perform power communication using the power pulse VL (S340).

On the other hand, in response to no particular voltage drop other than that caused by data communication being detected from the power pulse VL or the voltage of the power pulse VL being higher than the threshold voltage V_polling of a polling signal, the active slave device 300 is maintained to operate in the transmission mode Tx (S350). Accordingly, the host device 100 is maintained to operate in the reception mode Rx due to the characteristics of half-duplex communication.

Figure 24:
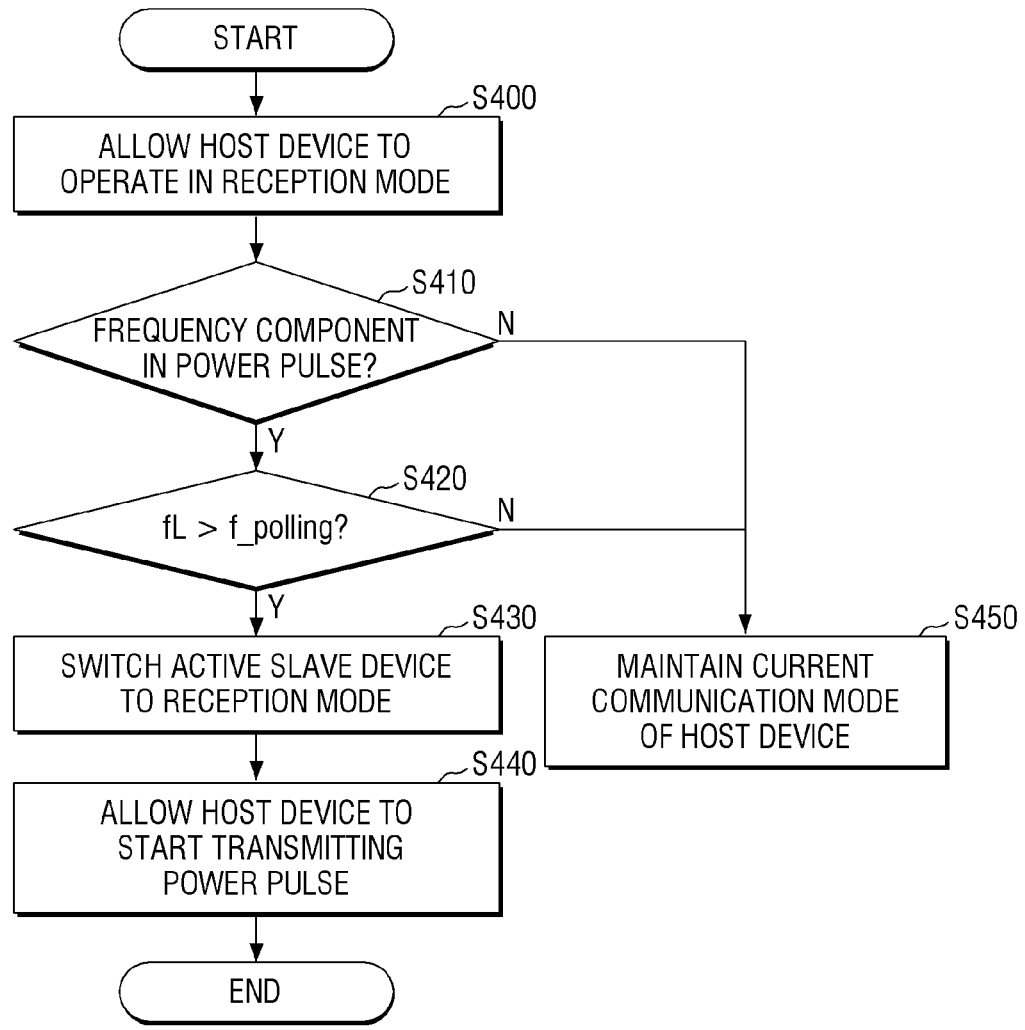
FIG. 24 is a flowchart illustrating a method of transmitting a polling signal for half-duplex communication using a variation in frequency, according to an exemplary embodiment of the present disclosure.

FIG. 24 is a flowchart illustrating a method of transmitting a polling signal for half-duplex communication using a variation in frequency, according to an exemplary embodiment of the present disclosure.

Another exemplary method for half-duplex communication between the host device 100 and the active slave device 300 according to the present disclosure will hereinafter be described with reference to FIG. 24. The host device 100 and the active slave device 300 may use a variation in the frequency of a power pulse VL as a polling signal.

In a case in which the host device 100 operates in the reception mode Rx, the host device 100 cannot transmit a data signal to the active slave device 300. Thus, the host device 100 needs to encode a polling signal in a power pulse VL.

In a case in which data is transmitted from the active slave device 300 to the host device 100, the host device 100 operates in the reception mode Rx (S400). Due to the characteristics of half-duplex communication, the active slave device 300 operates in the transmission model Tx when the host device 100 operates in the reception model Rx.

In a case in which the host device 100 attempts to operate in the transmission mode Tx, the host current fluctuation generator 211 may apply a predefined frequency fL to a power pulse VL. The predefined frequency fL needs to be set to a different level from a clock frequency for use in data communication. The active slave device 300 determines whether there exists a frequency component other than the clock frequency for use in data communication in the power pulse VL (S410).

In response to a determination being made that there exists an additional frequency component in the power pulse VL, the active slave device 300 determines whether the frequency fL caused by the additional frequency component is higher than a threshold frequency f_polling of a polling signal (S420).

In actual circuitry, the voltage of the power pulse VL may fluctuate due to various active devices present in the active slave device 300. In the case of transmitting a polling signal using a variation in frequency, the polling signal can be transmitted without error regardless of the variation, in real time, of the voltage of the power pulse VL.

In response to the additional frequency being detected, the active slave device 300 stops transmitting data through power communication and is switched from the transmission mode Tx to the reception mode Rx (S430).

In response to the active slave device 300 being switched to the reception mode Rx, the host device 100 is switched from the reception mode Rx to the transmission mode Tx. Then, the host device 100 begins to perform power communication using the power pulse VL (S440).

On the other hand, in response to no additional frequency component other than the clock frequency for use in data communication being detected from the power pulse VL or the frequency of the power pulse VL being lower than the threshold frequency f_polling of a polling signal, the active slave device 300 is maintained to operate in the transmission mode Tx (S450). Accordingly, the host device 100 is maintained to operate in the reception mode Rx due to the characteristics of half-duplex communication.

Each of the half-duplex communication methods of FIGS. 23 and 24 may be implemented as a program that can be executed by the host device 100 and may be executed in the host device 100 by using a recording medium that can be read by the host device 100.

Figure 25:
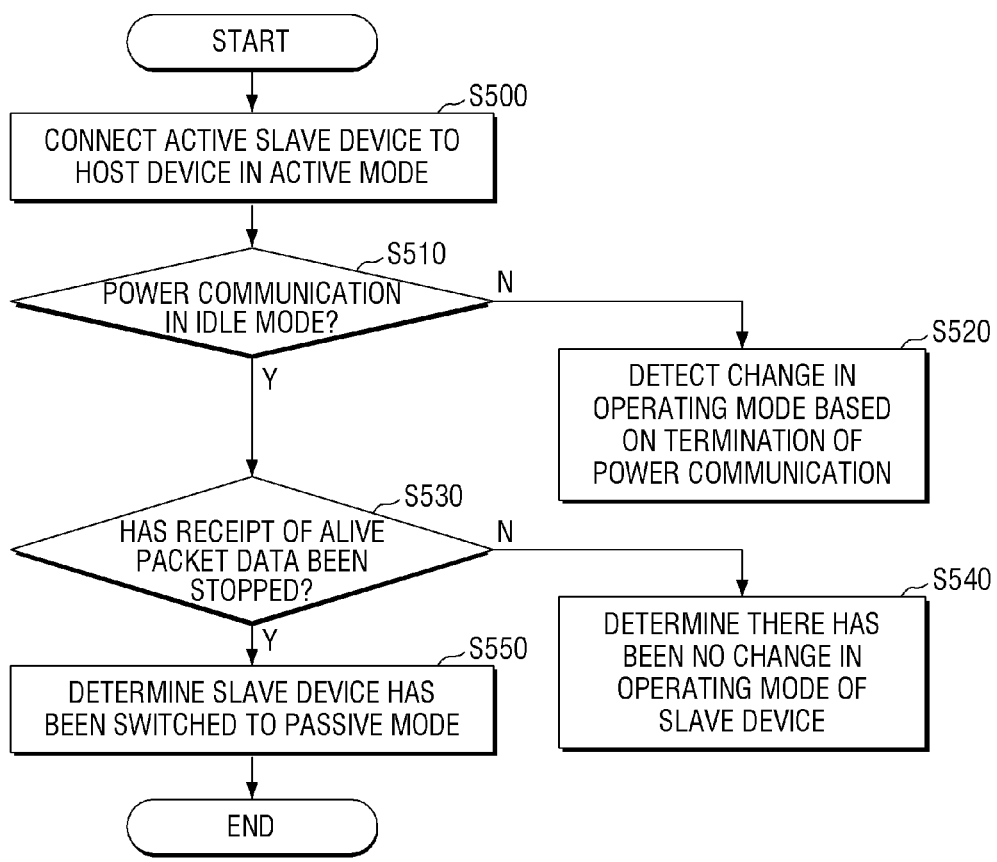
FIG. 25 is a flowchart illustrating a method of recognizing the attribute of an active slave device in real time, according to an exemplary embodiment of the present disclosure.

FIG. 25 is a flowchart illustrating a method of recognizing the attribute of an active slave device in real time, according to an exemplary embodiment of the present disclosure.

By using the A/P switching switch 360 of the active slave device 300, the operating mode of the active slave device 300 may be switched even when the active slave device 300 is connected to the host device 100.

More specifically, in a case in which the operating mode of the active slave device 300 is switched from a passive mode to an active mode by the A/P switching switch 360 while being connected to the host device 100 in the passive mode, the host communication module 200 determines that a new slave device has been received, and may detect a change in the attribute of the active slave device 300 with the aid of the attribute recognition unit 230.

Referring to FIG. 25, the active slave device 300 may be connected in an active mode to the host device 100 (S500). The host communication module 200 determines whether the host device 100 and the active slave device 300 perform power communication in an idle mode (S510).

In a case in which the active slave device 300 is switched to a passive mode when the host device 100 and the active slave device 300 perform power communication in a mode other than an idle mode, the power communication between the host device 100 and the active slave device 300 is suddenly terminated. Then, the host communication module 200 detects the termination of the power communication between the host device 100 and the active slave device 300 and identifies that the operating mode of the active slave device 300 has been switched from an active mode to a passive mode (S520).

In a case in which the host device 100 and the active slave device 300 perform power communication in an idle mode, no data transmission occurs between the host device 100 and the active slave device 300, and thus, a change in the operating mode of the active slave device 300 cannot be detected based on whether the power communication between the host device 100 and the active slave device 300 is terminated. In this case, a change in the operating mode of the active slave device 300 may be detected based on alive packet data transmitted by the active slave device 300.

In a case in which the power communication between the host device 100 and the active slave device 300 is performed in an idle mode, the A/P packet generation unit 370 of the active slave device 300 transmits alive packet data to the host communication module 200 in the form of a periodic voltage pulse. The alive packet data is not particularly limited to being a periodic voltage pulse.

In a case in which the power communication between the host device 100 and the active slave device 300 is performed in an idle mode, the host communication module 200 receives the alive packet data. The real-time attribute recognizer 214 of the host communication module 200 determines whether the receipt of the alive packet data has been terminated (S530).

Since the A/P packet generation unit 370 stops transmitting the alive packet data in response to the active slave device 300 being switched to a passive mode, the host communication module 200 determines that there has been no change in the operating mode of the active slave device 300 (S540) if the alive packet data continues to be received.

On the other hand, if the receipt of the alive packet data is terminated, the real-time attribute recognizer 214 of the host communication module 200 determines that the active slave device 300 has been switched to a passive mode (S550).

Once a change in the operating mode of the active slave device 300 is detected, the real-time attribute recognizer 214 adjusts the switch SW2 of the terminal connection unit 220 and thus configures circuitry so as for the host device 100 to terminate power communication.

The method of FIG. 25 may be implemented as a program that can be executed by the host device 100 and may be executed in the host device 100 by using a recording medium that can be read by the host device 100.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A host communication module, which is provided in a host device that can be connected to a slave device, comprising:
   a host power communication unit, in a transmission mode, receiving a power voltage for driving an active slave device from the host device and allowing the host device and the active slave device to perform power communication using the power voltage, and in a reception mode, receiving a power pulse from the active slave device and allowing the host device and the active slave device to perform power communication using the power pulse; and
   a terminal connection unit transmitting or receiving the power pulse to or from the active slave device via a microphone jack provided in the host device,
   wherein the host power communication unit includes a host current fluctuation generator, which, in the transmission mode, receives host data from the host device, generates the power pulse for the active slave device by encoding the power voltage into a first voltage or a second voltage different from the first voltage, and supplies the power pulse to the active slave device via the microphone jack, and a host voltage fluctuation detector, which, in the reception mode, detects a variation in a voltage of the power pulse caused by a manipulation of the active slave device and decodes slave data received from the active slave device by using the detected variation in the voltage of the power pulse,
   wherein if the host device needs to be switched from the reception mode to the transmission mode, the host current fluctuation generator generates a polling signal and transmits the polling signal to the active slave device using the power pulse, and
   wherein the polling signal lowers the voltage of the power pulse to a third voltage.

2. The host communication module of claim 1, wherein the first and second voltages are both higher than a driving voltage for driving the active slave device.

3. The host communication module of claim 1, wherein:
   if the active slave device is in the reception mode, the host power communication unit operates in the transmission mode; and
   if the active slave device is in the transmission mode, the host power communication unit operates in the reception mode.

4. The host communication module of claim 1, wherein the third voltage is lower than the voltage of the power pulse in the absence of the polling signal and is higher than the driving voltage.

5. The host communication module of claim 1, wherein the polling signal allows the power pulse to operate at a first frequency.

6. The host communication module of claim 1, wherein the host voltage fluctuation detector restores the slave data by comparing the voltage of the power pulse with a predefined reference voltage and provides the restored slave data to the host device.

7. The host communication module of claim 1, further comprising:
   a digital-to-analog signal (D/A) converter connected to the host voltage fluctuation detector, converting digital data, which is obtained by decoding the power pulse received from the active slave device into an analog signal, and transmitting the analog signal to the host device.

8. The host communication module of claim 1, further comprising:
   a real-time attribute recognizer connected to the host voltage fluctuation detector and recognizing a change in the attribute of the active slave device in real time by recognizing alive packet data transmitted by the active slave device.

9. The host communication module of claim 8, wherein:
   if the voltage fluctuation detector receives the alive packet data, the real-time attribute recognizer determines that the attribute of the active slave device has not changed; and
   if the voltage fluctuation detector does not receive the alive packet data, the real-time attribute recognizer determines that the attribute of the active slave device has changed so as for the active slave device to become a passive slave device.

10. A host communication module, which is provided in a host device that can be connected to a slave device, comprising:
    a terminal connection unit receiving a bias voltage from the host device and connected to at least one terminal for electrical connection to the slave device; and
    an attribute recognition unit detecting a drop in the bias voltage, determining the slave device as being an active slave device if the dropped bias voltage is higher than a key recognition voltage and lower than a regular bias voltage, and determining the slave device as being a passive slave device if the dropped bias voltage is not lower than the regular bias voltage, and
    a host current fluctuation generator generating a power pulse for the active slave device by encoding a power voltage into a first voltage or a second voltage different from the first voltage, and supplying the power pulse to the active slave device via a microphone jack, and the host current fluctuation generator generating a polling signal and transmitting the polling signal to the active slave device using the power pulse if the host device needs to be switched from a reception mode to a transmission mode, wherein the polling signal lowers the voltage of the power pulse to a third voltage.

11. The host communication module of claim 10, wherein if the slave device is determined as being the active slave device by the attribute recognition unit, the attribute recognition unit allows the host device to transmit an authorization signal to the active slave device.

12. A host communication module provided in a host device, which can be connected to a slave device, comprising:

a terminal connection unit receiving a bias voltage from the host device and connected to at least one terminal for electrical connection to the slave device; and an attribute recognition unit detecting a variation in a frequency of the bias voltage, determining the slave device as being an active slave device if the varied frequency of the bias voltage is higher than a predetermined frequency band, and determining the slave device as being a passive slave device if the varied frequency of the bias voltage is not higher than the predetermined frequency band, and a host current fluctuation generator generating a power pulse for the active slave device by encoding a power voltage into a first voltage or a second voltage different from the first voltage, and supplying the power pulse to the active slave device via a microphone jack, and the host current fluctuation generator generating a polling signal and transmitting the polling signal to the active slave device using the power pulse if the host device needs to be switched from a reception mode to a transmission mode, wherein the polling signal lowers the voltage of the power pulse to a third voltage.

13. The host communication module of claim 12, wherein if the slave device is determined as being the active slave device by the attribute recognition unit, the attribute recognition unit allows the host device to transmit an authorization signal to the active slave device.

\* \* \* \* \*